(12) United States Patent
Hiraga

(10) Patent No.: US 7,203,749 B2
(45) Date of Patent: Apr. 10, 2007

(54) CONTENTS FILTERING METHOD, CONTENTS FILTERING APPARATUS AND CONTENTS FILTERING PROGRAM

(75) Inventor: Masaki Hiraga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 534 days.

(21) Appl. No.: 10/105,186

(22) Filed: Mar. 26, 2002

(65) Prior Publication Data

US 2003/0093518 A1    May 15, 2003

(30) Foreign Application Priority Data

Nov. 13, 2001    (JP)    ............................. 2001-346835

(51) Int. Cl.
G06F 15/173 (2006.01)
G06F 15/16 (2006.01)

(52) U.S. Cl. ...................... 709/224; 709/206; 709/223; 709/246

(58) Field of Classification Search ................ 709/217, 709/224, 225, 229, 206, 223, 246
See application file for complete search history.

(56) References Cited

U.S. PATENT DOCUMENTS

| | | | | |
|---|---|---|---|---|
| 5,970,477 | A | * | 10/1999 | Roden ........................ 705/32 |
| 5,987,611 | A | | 11/1999 | Freund |
| 6,021,438 | A | * | 2/2000 | Duvvoori et al. ........... 709/224 |
| 6,363,383 | B1 | | 3/2002 | Kindo et al. |
| 6,507,866 | B1 | * | 1/2003 | Barchi ........................ 709/207 |
| 6,606,659 | B1 | * | 8/2003 | Hegli et al. .................. 709/225 |
| 6,643,687 | B1 | * | 11/2003 | Dickie et al. ................ 709/206 |
| 6,829,635 | B1 | * | 12/2004 | Townshend .................. 709/206 |
| 2002/0013854 | A1 | * | 1/2002 | Eggleston et al. .......... 709/234 |
| 2002/0111887 | A1 | * | 8/2002 | McFarlane et al. .......... 705/30 |

FOREIGN PATENT DOCUMENTS

| | | |
|---|---|---|
| JP | 11-195034 | 7/1999 |
| JP | 2000-163341 | 6/2000 |
| WO | 01/55873 | 8/2001 |
| WO | WO 01/55867 A1 | 8/2001 |
| WO | WO 01/55873 A1 | 8/2001 |

OTHER PUBLICATIONS

European Patent Office Search Report for corresponding Appln. No. EP 02252699 dated Sep. 10, 2004.

(Continued)

Primary Examiner—Ario Etienne
Assistant Examiner—Hussein El-chanti
(74) Attorney, Agent, or Firm—Staas & Halsey LLP

(57) ABSTRACT

A contents filtering method is capable of allowing use of network resources to be filtered, within a predetermined allowable range. The contents filtering method monitors communications of contents on the network and determining whether the contents are regulated contents satisfying predefined regulatory requirements or not (step S1), and then counts the number of times that the regulated contents are communicated (step S2). The contents filtering method converts a loss caused by communicating the regulated contents into an incurred cost based on the counted number of times that the regulated contents are communicated (step S3), and, if the incurred cost is in excess of a preset permitted cost, inhibits subsequent communications of the regulated contents (step S4).

9 Claims, 20 Drawing Sheets

OTHER PUBLICATIONS

"The 1999 Utility Guide: Corporate Filtering", PC Magazine, May 4, 1999, pp. 1-11.
Japanese Abstract No. 2000-322380, dated Nov. 24, 2000.
Japanese Abstract No. 2001-222513, dated Aug. 17, 2001.
Japanese Abstract No. 2000-047927, dated Feb. 18, 2000.
Japanese Abstract No. 2000-112852, dated Apr. 21, 2000.
Japanese Abstract No. 2000-165449, dated Jun. 16, 2000.
Japanese Abstract No. 2000-222323, dated Aug. 11, 2000.
Japanese Abstract No. 2000-357176, Dec. 26, 2000.
Japanese Abstract No. 2001-101108, dated Apr. 13, 2001.
Japanese Abstract No. 02-015753, dated Jan. 19, 1990.
Japanese Office Action dated Aug. 26, 2006 of Application No. 2001-346835.

* cited by examiner

183a CORPORATION INFORMATION TABLE

| A CORPORATION | |
|---|---|
| LOCATION | 〒xxx-xxxx yy-zz-ww, xxx CHO, xxx KU, TOKYO |
| TELEPHONE NUMBER | 03-xxxx-xxxx |
| CAPITAL | xx,xxx (MILLION YEN) |
| NUMBER OF EMPLOYEES | 3456 |
| STOCKS | LISTED |
| NUMBER OF FACTORIES/OFFICES | 70 |
| ESTABLISHED | xx, 19xx |
| NUMBER OF STOCK HOLDERS | 1,234 (PERSONS) |
| ⋮ | ⋮ |
| NAMES OF DEPARTMENTS | DEPARTMENT 1 |
| | DEPARTMENT 2 |
| | ⋮ |
| | DEPARTMENT n |
| ⋮ | ⋮ |
| AVERAGE WAGE PER HOUR (PER PERSON) | 1,200 (YEN/HOUR·PERSON) |
| PERMITTED TIME FOR PRIVATE USE (PER PERSON) | 0.5 (HOUR/DAY·PERSON) |
| NUMBER OF YEARLY LABOR DAYS (PER PERSON) | 220 (DAYS/PERSON) |
| NUMBER OF MONTHLY LABOR DAYS (PER PERSON) | 18.3 (DAYS/PERSON) |
| ⋮ | ⋮ |
| CORPORATION DOMAIN NAME | a.co.jp |
| ⋮ | ⋮ |
| MONTHLY PERMITTED COST | 37,000,000 (YEN) |
| MONTHLY INCURRED COST | 25,000,200 (YEN) |
| ⋮ | ⋮ |

| REGULATED URL ACCESS HISTORY INFORMATION | TRAVEL | 0 | (20314) |
|---|---|---|---|
| | SPORTS | 2 | (21055) |
| | JOB SEARCH | 0 | (961) |
| | ENTERTAINMENT | 3 | (19968) |
| | VEHICLES | 0 | (35434) |
| | NON-TRADISIONAL RELIGION | 0 | (190) |
| | ⋮ | ⋮ | ⋮ |
| E-MAIL TRANSMISSION POLICY VIOLATION HISTORY INFORMATION | LEAKAGE OF CONFIDENTIAL INFORMATION | 0 | (0) |
| | USE OF SLANDEROUS WORD | 0 | (0) |
| | FORGETTING TO SEND COPY (CC) TO SUPERVISOR | 1 | (1420) |
| | FORGETTING TO MARK "CONFIDENTIAL" ON CONFIDENTIAL DOCUMENT | 1 | (130) |
| | TRANSMISSION OF IMAGE DATA OUT OF CORPORATION | 0 | (221) |
| | ⋮ | ⋮ | ⋮ |

FIG. 5

183a CORPORATION INFORMATION TABLE

| NAMES OF DEPARTMENTS | DEPART- MENT 1 | DEPART- MENT 2 | ... | DEPART- MENT 3 |
|---|---|---|---|---|
| ⋮ | ⋮ | ⋮ | | ⋮ |

183b DEPARTMENT INFORMATION TABLE

| DEPARTMENT 2 | | | |
|---|---|---|---|
| NUMBER OF MEMBERS | 234 (PERSONS) | | |
| EMPLOYEE NOS. OF MEMBERS | 0004 | | |
| | 0016 | | |
| | ⋮ | | |
| | 3321 | | |
| | ⋮ | | |
| ⋮ | ⋮ | | |
| DEPARTMENT DOMAIN NAME | bumon-2.a.co.jp | | |
| ⋮ | ⋮ | | |
| MONTHLY PERMITTED COST | 25,000,000 (YEN) | | |
| MONTHLY INCURRED COST | 20,000,200 (YEN) | | |
| ⋮ | ⋮ | | |
| REGULATED URL ACCESS HISTORY INFORMATION | TRAVEL | 0 | (1919) |
| | SPORTS | 2 | (2416) |
| | JOB SEARCH | 0 | (131) |
| | ENTERTAINMENT | 3 | (1067) |
| | VEHICLES | 0 | (1854) |
| | NON-TRADITIONAL RELIGION | 0 | (11) |
| | ⋮ | ⋮ | ⋮ |
| LEAKAGE OF CONFIDENTIAL INFORMATION | LEAKAGE OF CONFIDENTIAL INFORMATION | 0 | (0) |
| | USE OF SLANDEROUS WORD | 0 | (0) |
| | FORGETTING TO SEND COPY (CC) TO SUPERVISOR | 1 | (172) |
| | FORGETTING TO MARK "CONFIDENTIAL" ON CONFIDENTIAL DOCUMENT | 1 | (8) |
| | TRANSMISSION OF IMAGE DATA OUT OF CORPORATION | 0 | (9) |
| | ⋮ | ⋮ | ⋮ |
| ⋮ | ⋮ | | |

| DEPARTMENT INFORMATION TABLE ||||||
|---|---|---|---|---|---|
| NAME OF DEPARTMENT | DEPARTMENT 2 |||||
| ⋮ | ⋮ |||||
| EMPLOYEE NOS. OF MEMBERS | 0004 | 0016 | ⋯ | 3321 | ⋯ |
| ⋮ | |||||

183c EMPLOYEE INFORMATION TABLE

| EMPLOYEE NO. 3321 |||
|---|---|---|
| NAME | YAMADA TARO ||
| DEPARTMENT | DEPARTMENT 2 ||
| ⋮ | ⋮ ||
| CLIENT NAME | tyamada.bumon-2.a.co.jp ||
| CLIENT IP ADDRESS | 10.3.1.24 ||
| E-MAIL ADDRESS | tyamada@bumon-2.a.co.jp ||
| ⋮ | ⋮ ||
| MONTHLY PERMITTED COST | 10,000 (YEN) ||
| MONTHLY INCURRED COST | 6,700 (YEN) ||
| ⋮ | ⋮ ||
| REGULATED URL ACCESS HISTORY INFORMATION | TRAVEL | 0 | (6) |
| | SPORTS | 2 | (5) |
| | JOB SEARCH | 0 | (0) |
| | ENTERTAINMENT | 3 | (8) |
| | VEHICLES | 0 | (3) |
| | NON-TRADITIONAL RELIGION | 0 | (0) |
| | ⋮ | ⋮ | ⋮ |
| LEAKAGE OF CONFIDENTIAL INFORMATION | LEAKAGE OF CONFIDENTIAL INFORMATION | 0 | (0) |
| | USE OF SLANDEROUS WORD | 0 | (0) |
| | FORGETTING TO SEND COPY (CC) TO SUPERVISOR | 1 | (3) |
| | FORGETTING TO MARK "CONFIDENTIAL" ON CONFIDENTIAL DOCUMENT | 1 | (1) |
| | TRANSMISSION OF IMAGE DATA OUT OF CORPORATION | 0 | (0) |
| | ⋮ | ⋮ | ⋮ |
| ⋮ | ⋮ ||

FIG. 7

184a URL COST CONVERSION TABLE

| TYPES OF REGULATED SITES | COST (LOSS) {YEN} |
|---|---|
| TRAVEL | 100 |
| SPORTS | 100 |
| JOB SEARCH | 50 |
| ENTERTAINMENT | 200 |
| VEHICLES | 200 |
| NON-TRADITIONAL RELIGION | 500 |
| ⋮ | ⋮ |

FIG. 8

184b    E-MAIL COST CONVERSION TABLE

| TYPES OF POLICY VIOLATIONS | COST (LOSS) {YEN} |
|---|---|
| LEAKAGE OF CONFIDENTIAL INFORMATION | <PERMITTED COST> |
| USE OF SLANDEROUS WORD | 1000 |
| FORGETTING TO SEND COPY (CC) TO SUPERVISOR | 100 |
| FORGETTING TO MARK "CONFIDENTIAL" ON CONFIDENTIAL DOCUMENT | 100 |
| TRANSMISSION OF IMAGE DATA OUT OF CORPORATION | 100 |
| ⋮ | ⋮ |

FIG. 9

171 ACCESS HISTORY INFORMATION

| DATE | TIME | REQUESTING SOURCE | ACCESS DESTINATION | IP ADDRESS | CATEGORY |
|---|---|---|---|---|---|
| OCTOBER 18, 2001 | 10:15:32 | 10.3.1.24 | www.f.com | xxx.xxx.xxx.xxx | SPORTS |
| OCTOBER 18, 2001 | 10:15:34 | 10.3.1.24 | www.z.com | zzz.zzz.zzz.zzz | JOB SEARCH |
| ... | ... | ... | ... | ... | ... |

FIG. 10

113 MAIL TRANSMISSION HISTORY INFORMATION

| DATE OF TRANS-MISSION | SENDER ADDRESS | RECEIVER, SIMULTANEOUS RECIPIENT ADDRESS | MAIL TITLE | MAIL TEXT | POLICY VIOLATION |
|---|---|---|---|---|---|
| OCTOBER 18, 2001 15:43:52 | tyamada @bumon-2.a.co.jp | hiraga@bumon-2.a.co.jp butyou@bumon-2.a.co.jp (cc) | REGARDING REQUEST TO MANUFACTURE PARTS | MAIL DATA #1 | NONE |
| OCTOBER 18, 2001 15:55:03: | tyamada @bumon-2.a.co.jp | aaa@bumon-2.a.co.jp | REGARDING MEETING ABOUT PRODUCT SPECIFICATIONS | MAIL DATA #2 | FORGETTING TO SEND COPY (CC) TO SUPERVISOR |
| ... | ... | ... | ... | ... | ... |

FIG. 11

CONTENTS FILTERING METHOD, CONTENTS FILTERING APPARATUS AND CONTENTS FILTERING PROGRAM

BACKGROUND OF THE INVENTION (1) Field of the Invention

The present invention relates to a contents filtering method, a contents filtering apparatus, and a contents filtering program for filtering contents on a network, and more particularly to a contents filtering method, a contents filtering apparatus, and a contents filtering program for filtering contents against inappropriate use such as private use.

(2) Description of the Related Art

In the past several years, there has been pointed out the problem of private use of the Internet by employees of corporations during the working hours. Private use of the Internet tends to increase a wasteful traffic volume, reduce the working efficiency in corporations and the learning efficiency in schools, and lower the morals of employees, students, and pupils. The terms IAC (Internet Access Control) and EIM (Employee Internet Management) have been produced against the above background.

Recently, some corporations use software based on the concept of contents filtering to prevent employees of the corporations from obtaining inappropriate contents from the Internet via terminals in the corporations. The software for contents filtering includes URL (Uniform Resource Locator) filtering software (Internet filtering software) and e-mail filtering software.

The URL filtering software is software for regulating access to inappropriate home pages on the Internet. A computer in which the URL filtering software is installed monitors connections from the intranet to the Internet. The computer regulates requests for access to regulated URLs which have been registered in advance. Examples of the URL filtering software are WebSENSE (Net Partners Internet Solutions, Inc.) and Cyber Patrol (The Learning Company).

The e-mail filtering software is software for preventing confidential information from leaking out of corporations. A computer in which the e-mail filtering software is installed checks the contents of e-mail messages produced in the corporation and prohibits e-mail messages from being transmitted outside the corporation if those e-mail messages contain certain prespecified keywords. Examples of the e-mail filtering software include GUARDIAN WALL (Sumitomo Metal System Solutions Co., Ltd.) and MIMEsweeper (Content Technologies Co. Ltd.).

Using the above contents filtering techniques is effective to prevent the employees of corporations from inappropriately using the Internet connected to the corporations.

However, excessive limitations on access to the Internet give inconveniences to users, and the conventional contents filtering software has been not flexible enough in limiting access attempts. Specifically, since access to contents which have been specified as regulated contents has heretofore been inhibited at all times, users are unable to obtain those contents even if their acquisition is needed for business purposes.

For example, before an employee of a corporation makes a business trip to a foreign country, they may want to confirm, in advance, various pieces of information about the country, such as security, etc. If contents relating to "military forces and terrorism", "racism", "religion", "crimes", "travel", etc. on the Internet are regulated against access from the corporation, then the employee may not possibly collect useful items of information from the Internet.

As described above, contents which are usually not related to business whatsoever may sometimes be necessary for business purposes. If access to these contents is fully inhibited, then the business efficiency may be lowered though the inhibition of access to those contents instead of increasing the business efficiency.

Access to the Internet may be limited only during certain hours, e.g., working hours. However, the recent trend of corporate employee management is shifting from working hours to other management indicators as evidenced by the introduction of the flex-time system and the payment-on-result system. Therefore, even if access to the Internet for private use is allowed during a certain period of time, such a policy is likely to depart from actual user needs.

There has been a demand for a system for allowing access to contents which have been specified as regulated contents insofar as such access does not excessively obstruct business activities.

While the URL filtering process and the e-mail filtering process have the same purpose of inhibiting private use of network resources, they have heretofore been operated and managed separately as they handle different entities. However, in order to perform contents filtering as a corporation's policy, it is necessary to control and manage the different filtering processes in a unified fashion.

SUMMARY OF THE INVENTION

It is therefore an object of the present invention to provide a contents filtering method which is capable of allowing use of network resources to be filtered, within a predetermined allowable range.

To achieve the above object, there is provided a contents filtering method of filtering contents on a network. The contents filtering method comprises the steps of monitoring communications of contents on the network and determining whether the contents are regulated contents satisfying predefined regulatory requirements or not, counting the number of times that the regulated contents are communicated, converting a loss caused by communicating the regulated contents into an incurred cost based on the counted number of times that the regulated contents are communicated, and, if the incurred cost is in excess of a preset permitted cost, inhibiting subsequent communications of the regulated contents.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is an example of diagram showing a corporate information table in an information table;

FIG. 6 is an example of diagram showing a department information table in the information table;

FIG. 7 is an example of diagram showing an employee information table in the information table;

FIG. 8 is an example of diagram showing a URL cost conversion table in a cost conversion table;

FIG. 9 is an example of diagram showing an e-mail cost conversion table in the cost conversion table;

FIG. 10 is an example of diagram showing access history information;

FIG. 11 is an example of diagram showing mail transmission history information;

DESCRIPTION OF THE PREFERRED EMBODIMENTS

First, the concept of the present invention which is applicable to embodiments of the present invention will be described below, and then specific embodiments of the present invention will be described later on.

Figure 1:
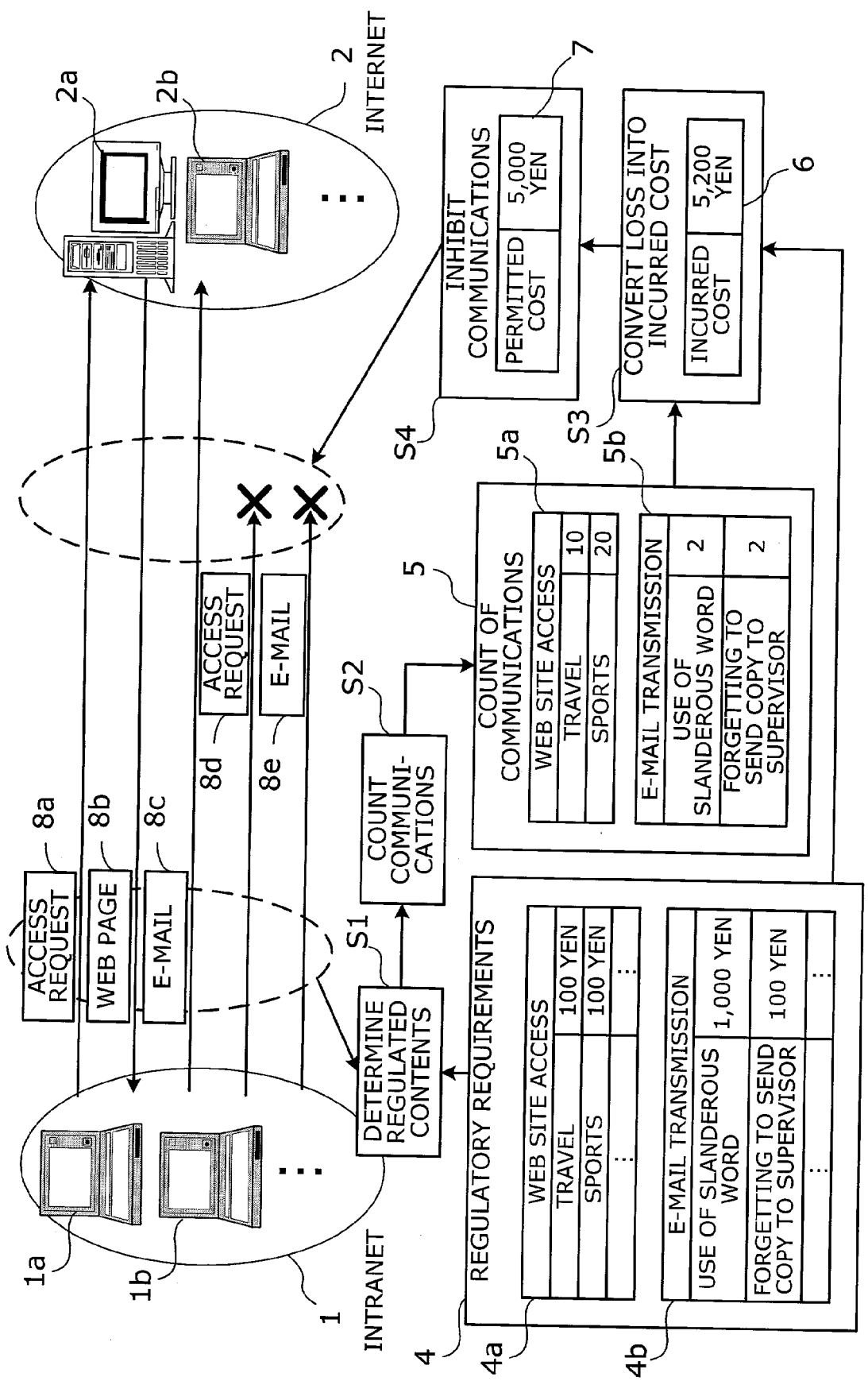
FIG. 1 is a block diagram showing the concept of the present invention.

FIG. 1 shows the concept of the present invention. As shown in FIG. 1, a network comprises an intranet 1 and the Internet 2. Contents are filtered between client computers (clients) $1a$, $1b$, . . . in the intranet 1 and server computers (servers) $2a$, $2b$, . . . in the Internet 2. The server computers $2a$, $2b$, . . . serve as Web servers and mail servers.

In a contents filtering method according to the present invention, which is carried out on the network shown in FIG. 1, communications of contents on the network are monitored to determine whether contents are regulated contents satisfying predefined regulatory requirements 4 or not in step S1. The predefined regulatory requirements 4 include regulatory requirements $4a$ for access to Web sites, regulatory requirements $4b$ for the transmission of e-mail, etc. which are defined with respect to different regulated types. The regulated types with respect to access to Web sites include "travel", "sports", etc., and the regulated types with respect to the transmission of e-mail include "use of a slanderous word", "forgetting to send a copy to a supervisor", etc.

Based on the determined regulated contents, the number 5 of communications of the regulated contents is counted in step S2. For example, the number $5a$ of communications of contents satisfying the regulatory requirements $4a$ for access to Web sites, and the number $5b$ of communications of contents satisfying the regulatory requirements $4b$ for the transmission of e-mail are counted with respect to the regulated types.

Based on the counted number 5 of communications of the regulated contents, a loss caused by the communications of the regulated contents is converted into a cost, which is used as an incurred cost 6 in step S3. For example, a cost (loss) per communication event has been preset for each of the types of the regulatory requirements 4, and an incurred cost 6 is calculated based on the counted number 5 of communications of the regulated contents and the cost per communication event.

If the calculated incurred cost 6 exceeds a preset permitted cost 7, then subsequent communications of regulated contents are inhibited in step S4. Alternatively, if the calculated incurred cost 6 exceeds a preset permitted cost 7, then communications of all contents on the network may be inhibited.

In the contents filtering method according to the present invention, as described above, a loss of productivity such as access to regulated sites is automatically converted into an indicator (incurred cost 6) representative of the cost, and if the incurred cost 6 is lower than the permitted cost, then access to regulated sites is allowed, and only if the incurred cost 6 is higher than the permitted cost, then communications of regulated sites are limited. Therefore, access to regulated Web sites or the transmission of e-mail messages having regulated contents is permitted insofar as it remains in a certain range. As a result, communications of regulated contents are not inhibited uniformly, but are regulated flexibly.

For example, when an access request $8a$ for accessing a regulated Web page is outputted from one of the clients $1a$, $1b$, . . . , the access request $8a$ is sent to a Web server on the Internet 2 as long as the incurred cost 6 is not in excess of the permitted cost 7. In response to the access request $8a$, the Web server sends a Web page $8b$ to the client which has outputted the access request $8a$. Similarly, when regulated e-mail $8c$ is transmitted from one of the clients $1a$, $1b$, . . . , the e-mail $8c$ is transmitted to a mail server on the Internet 2 and stored in the mail box of the recipient as long as the incurred cost 6 does not exceed the permitted cost 7.

If the incurred cost 6 exceeds the permitted cost 7, then even when an access request $8d$ or e-mail $8e$ is outputted from one of the clients $1a$, $1b$, . . . , communications of those contents are inhibited. The access request $8d$ or e-mail $8e$ is blocked before it reaches the Internet 2.

It is thus possible to perform contents filtering in a state of balance accomplished between a cost (loss) which is caused by a reduction in the business efficiency due to a failure to access necessary information by fully inhibiting communications of regulated contents and a cost (loss) which is caused by privately performing communications of regulated contents.

Since the different filtering processes, i.e., the URL filtering process for filtering access to regulated sites and the e-mail filtering process for filtering policy violations, are carried out by determining whether communications are to be permitted or not based on a common indicator, the different filtering processes are unified from the standpoint of inappropriate use of the network.

If the permitted cost and the incurred cost are the same as each other, then communications of regulated contents may be either permitted or inhibited. In the following description, it is assumed that if the permitted cost and the incurred cost are the same as each other, then subsequent communications of regulated contents are inhibited. Thus, if the incurred cost is equal or higher than the permitted cost, subsequent communications of regulated contents are inhibited.

The contents filtering method shown in FIG. 1 can be carried out by a computer when the computer executes a program which defines the sequence of the contents filtering method. Embodiments of the present invention in which the contents filtering method is carried out by a computer connected to the network will be described in specific detail below.

Figure 2:
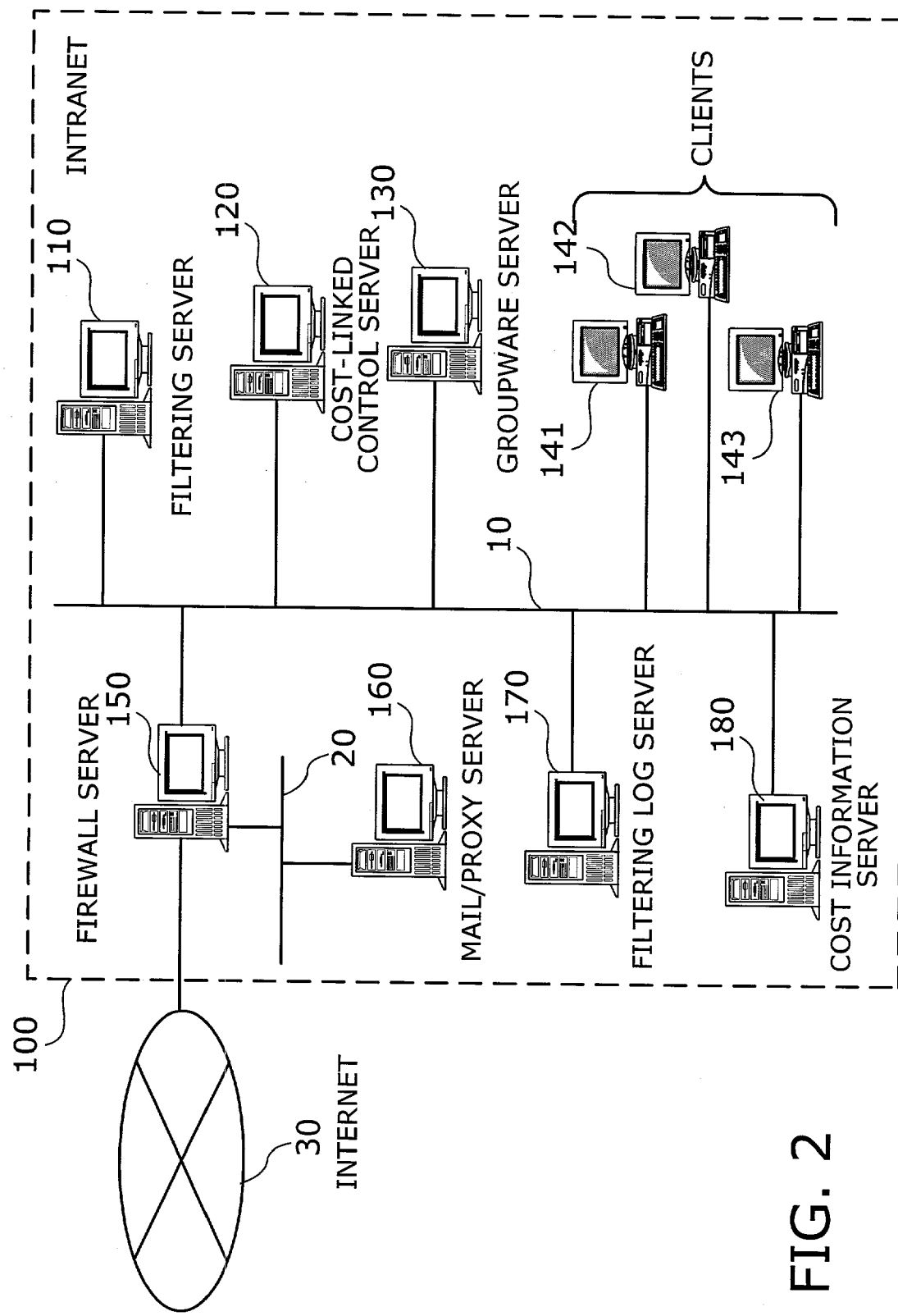
FIG. 2 is a view showing a system according to the present invention.

FIG. 2 shows a system according to the present invention. In the illustrated system, a filtering server 110, a cost-linked control server 120, a groupware server 130, clients 141, 142, 143, . . . , a firewall server 150, a filtering log server 170, and a cost information server 180 are connected to each other by a network 10 in an intranet 100. A mail/proxy server 160 is connected by the network 20 to the firewall server 150, which is connected to the Internet 30.

The filtering server 110 monitors access requests (HTTP (HyperText Transfer Protocol) access requests) for access to Web sites and e-mail messages which are transmitted via the network 10, and performs the URL filtering process and the e-mail filtering process. The filtering server 110 stores the history information (monitoring log) of e-mail messages to be filtered as e-mail history information.

The cost-linked control server 120 limits access via the Internet 30 depending on the incurred cost relative to contents that are acquired via the Internet 30.

The groupware server 130 has a function as a mail server in the intranet 100 and also limits the transmission of e-mail messages depending on the incurred cost relative to e-mail messages.

Each of the clients 141, 142, 143, . . . has a function (e.g., a Web browser) to browse the contents of computers connected via the Internet 30 and a function (e.g., mailer) to send and receive e-mail messages.

The firewall server 150 is a router installed for the purpose of blocking unauthorized access vie the Internet 30.

The mail/proxy server 160 is a server for providing security upon connection to the Internet 30 and sending and receiving e-mail messages via the Internet 30. The mail/proxy server 160 is provided on the network 20 which is a DMZ (DeMilitarized Zone).

The filtering log server 170 is a server for accumulating a history (monitoring log) of access events which have been made to contents on the Internet 30 via the filtering server 110.

The cost information server 180 is a server for calculating the permitted cost and the incurred cost.

When one of the clients 141, 142, 143, . . . outputs an access request for access to contents on the Internet 30, the access request is received by the cost-linked control server 120. The cost-linked control server 120 acquires information about the cost of private use of the Internet 30 from the cost information server 180, and determines whether or not the incurred cost is equal to or higher than the permitted cost. Only if the incurred cost is lower than the permitted cost, the cost-linked control server 120 transfers the access request to the filtering server 110.

The filtering server 110 determines whether an URL to be accessed is registered as a regulated URL or not. The filtering server 110 filters the Web access according to predetermined rules, and transfers the access request via the firewall server 150 to the mail/proxy server 160.

At this time, the contents of the access are transferred from the filtering server 110 to the filtering log server 170, which stores the contents of the access in the access history. The mail/proxy server 160 gains access to another computer connected via the Internet 30 through the firewall server 150, and acquires contents specified by the access request. The acquired contents are transmitted via the firewall server 150 to the client which has outputted the access request. The display screen of the client displays the received contents.

When one of the clients 141, 142, 143, . . . outputs a request to transmit an e-mail message, the e-mail message is transferred to the groupware server 130. The groupware server 130 acquires information relative to the cost of private use of the e-mail function from the cost information server 130, and determines whether or not the incurred cost is equal to or higher than the permitted cost. Only if the incurred cost is lower than the permitted cost, the groupware server 130 transfers the e-mail message to the filtering server 110.

The filtering server 110 determines whether the contents of the e-mail message to be transmitted are regulated contents or not, i.e., whether the e-mail message includes regulated words and regulated image information, and is set to simultaneous transmission (cc or Bcc) to a supervisor) or not. The filtering server 110 filters the e-mail message according to predetermined rules, and transfers the e-mail message via the firewall server 150 to the mail/proxy server 160. The mail/proxy server 160 then transmits the e-mail message to another mail server connected via the Internet 30 through the firewall server 150.

The cost information server 180 periodically collect Internet access history information and e-mail transmission history information from the filtering server 110 and the filtering log server 170, and calculates incurred costs for access to regulated contents on the Internet and incurred costs for the transmission of regulated e-mail messages for each corporate, each department, and each employee. The calculated incurred costs are provided to the cost-linked control server 120 and the groupware server 130.

Specific details of the system shown in FIG. 2 will be described below.

Figure 3:
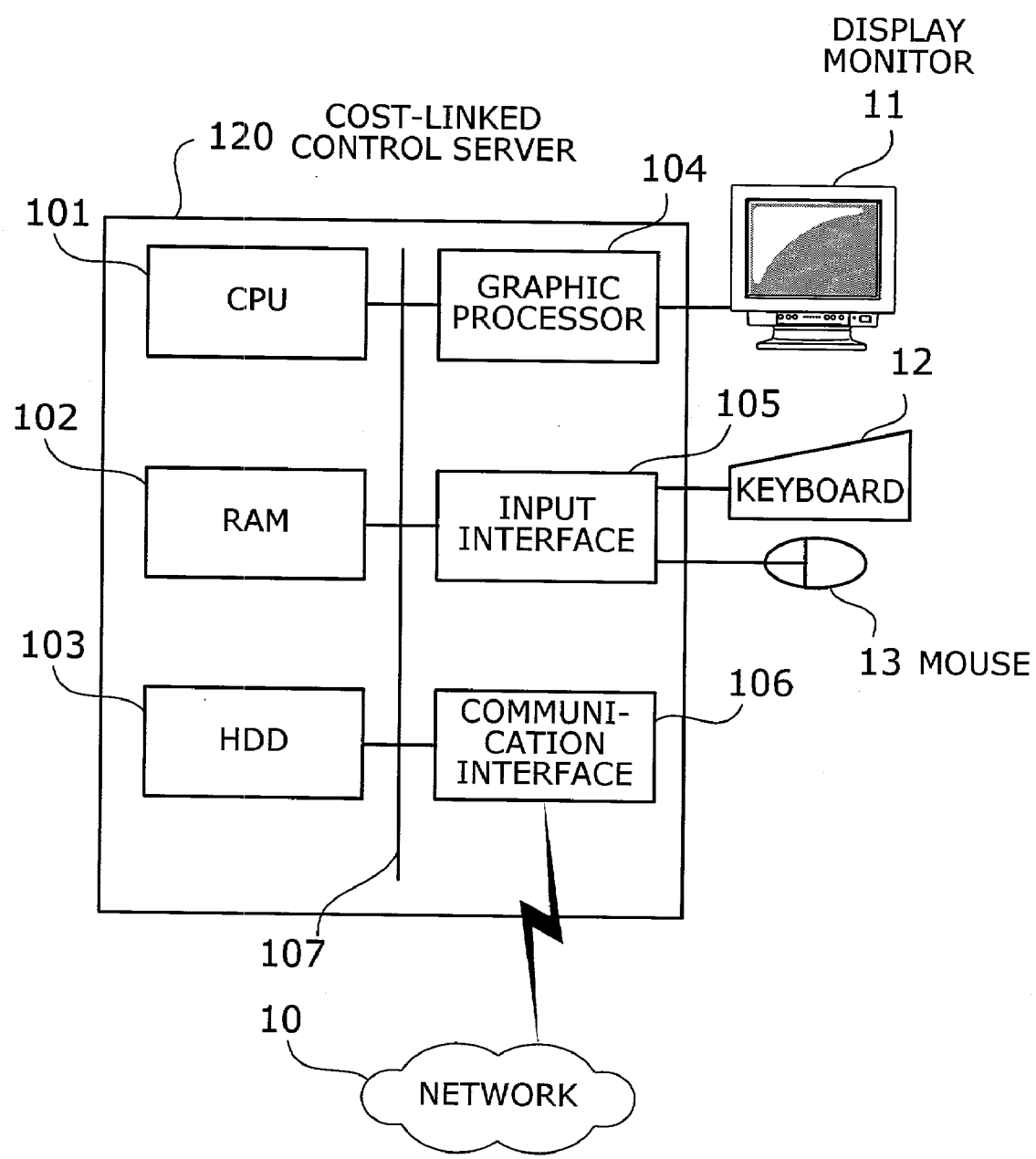
FIG. 3 is a block diagram of a hardware arrangement of a cost-linked control server.

FIG. 3 shows in block form a hardware arrangement of the cost-linked control server 120. As shown in FIG. 3, the Cost-linked control server 120 is controlled in its entirety by a CPU (Central Processing Unit) 101. To the CPU 101, there are connected a RAM (Random Access Memory) 102, a HDD (Hard Disk Drive) 103, a graphic processor 104, an input interface 105, and a communication interface 106 via a bus 107.

The RAM 102 temporarily stores at least part of an OS (Operating System) program and application programs that are to be executed by the CPU 101. The RAM 102 also stores various data required for the processing by the CPU 101. The HDD 103 stores the OS and the application programs.

A display monitor 11 is connected to the graphic processor 104. The graphic processor 104 displays images on the screen of the display monitor 11 according to instructions from the CPU 101. A keyboard 12 and a mouse 13 are connected to the input interface 105. The input interface 105 transmits signals entered from the keyboard 12 and the mouse 13 via the bus 107 to the CPU 101.

The communication interface 106 is connected to the network 10. The communication interface 106 sends data to and receives data from other computers via the network 10.

The hardware arrangement shown in FIG. 3 is capable of performing the various processing functions according to the present invention. While the hardware arrangement of the cost-linked control server 120 has been illustrated in FIG. 3, each of the filtering server 110, the cost-linked control server 120, the groupware server 130, the clients 141, 142, 143, . . . , the firewall server 150, the filtering log server 170, and the cost information server 180 can be of the same hardware arrangement as the cost-linked control server 120.

Figure 4:
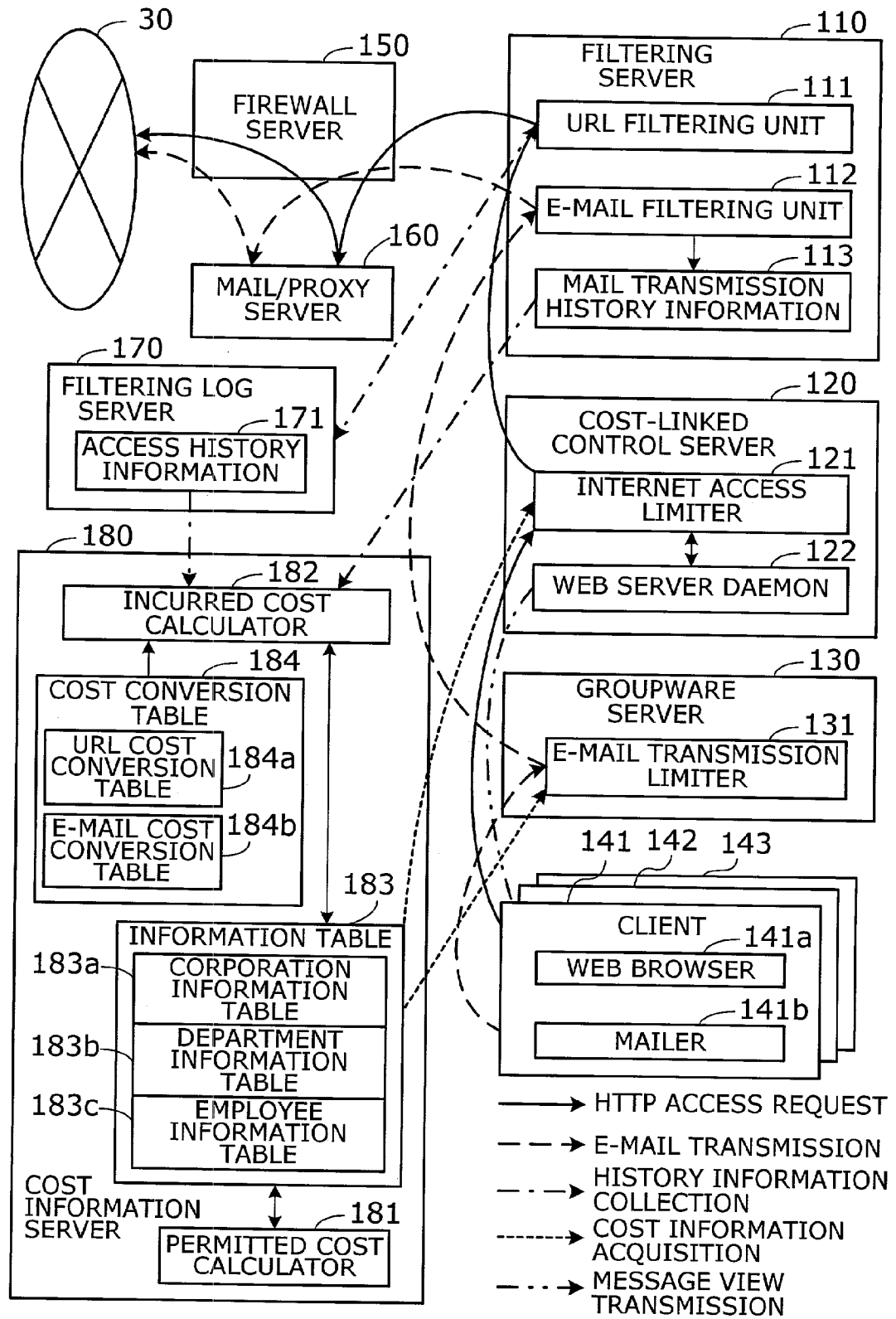
FIG. 4 is a functional block diagram of a system arrangement according to the present invention.

FIG. 4 is a functional block diagram of a system arrangement according to the present invention.

As shown in FIG. 4, the filtering server 110 has a URL filtering unit 111, an e-mail filtering unit 112, and mail transmission history information 113.

The URL filtering unit 111 regulates HTTP access from the clients 141, 142, 143, . . . . Regulated contents are represented by URL of Web sites. Whether the function of the URL filtering unit 111 to filter HTP access is to be used or not can be indicated by a flag (filtering activation flag) which represents filtering when it is ON and represents no filtering when it is OFF. The URL filtering unit 111 is a function performed when software called URL filtering software is executed.

The URL filtering unit 111 can analyze filtering events that have occurred based on access history information 171 and make a report of the analyzed results. For example, the URL filtering unit 111 can generate and display a report, a chart, and a graph of access attempts that have been transferred and rejected and sites that have been accessed.

The e-mail filtering unit 112 regulates the transmission of e-mail messages from the clients 141, 142, 143, . . . . Regulatory requirements for e-mail are defined as policies, and the transmission of e-mail messages which violate the policies is regulated. Whether the function of the e-mail filtering unit 112 to filter e-mail is to be used or not can be indicated by a flag (filtering activation flag) which represents filtering when it is ON and represents no filtering when it is OFF. The e-mail filtering unit 112 is a function performed when software called e-mail filtering software is executed. The e-mail filtering unit 112 stores a record of e-mail transmissions and also e-mail messages (including attachment files) which have been sent out as the mail transmission history information 113.

The e-mail filtering unit 112 is capable of browsing the contents of the mail transmission history information 113. An authorized administrator can use the e-mail filtering unit 112 to retrieve the record of e-mail transmissions from the mail transmission history information 113 and browse the contents of the stored e-mail messages. The e-mail filtering unit 112 can enable a Web browser 141a of a client 141 to browse statistical information in the mail transmission history information 113. For example, the Web browser 141a cab confirm the number of processed e-mail messages, how distribution control rules and contents inspection rules are applied, and e-mail messages sent to and received from each of the addresses in question.

The mail transmission history information 113 is a monitoring log of e-mail messages. The mail transmission history information 113 includes the contents of e-mail messages (headers, texts, and attached files) and information as to whether the e-mail messages are regulated e-mail messages or not.

The cost-linked control server 120 comprises an Internet access limiter 121 and a Web server daemon 122.

The Internet access limiter 121 regulates HTTP access from the clients 141, 142, 143, . . . via the Internet 30 according to a cost (incurred cost) converted from a loss caused by communications of regulated contents.

The Web server daemon 122 transmits a message view to the clients 141, 142, 143, . . . depending on the regulation of HTTP access by the Internet access limiter 121. The Web server daemon 122 is a function generally referred to as httpd (HyperText Transfer Protocol Daemon).

The groupware server 130 has a function to collect and distribute e-mail messages in the intranet 100, and also has an e-mail transmission limiter 131. The e-mail transmission limiter 131 limits the transmission of e-mail messages from the clients 141, 142, 143, . . . according to the cost (incurred cost) converted from the loss caused by communications of regulated contents. The e-mail transmission limiter 131 is a function performed when a script program that is plugged in a mail server whose API (Application Program Interface) is disclosed is executed.

The clients 141, 142, 143, . . . are terminals that are used by end users. The client 141 has a Web browser 141a and a mailer 141b. Similarly, each of the other clients 142, 143, . . . has a Web browser and a mailer.

The filtering log server 170 stores the access history information 171 which is a monitoring log for the URL filtering unit 111.

The cost information server 180 comprises a permitted cost calculator 181, an incurred cost calculator 182, an information table 183, and a cost conversion table 184.

The permitted cost calculator 181 calculates a cost (permitted cost) which is permitted within a required minimum range based on information set in the information table 183. The permitted cost calculator 181 sets the calculated permitted cost in the information table 183.

The incurred cost calculator 182 calculates a cost (incurred cost) of communications which match regulated conditions of the filtering process, based on the contents of the information table 183 and the cost conversion table 184.

The information table 183 stores information representing the details of each of the organizations of a corporation and information representing permitted costs and incurred costs. In the example shown in FIG. 4, the information table 183 comprises a corporation information table 183a, a department information table 183b, and an employee information table 183c. The corporation information table 183a represents information relative to the corporation which has introduced the system according to the present invention. The department information table 183b represents information relative to each of the departments of the corporation. The employee information table 183c represents information relative to each of the employees of the corporation.

The cost conversion table 184 defines costs corresponding to regulatory requirements of the filtering process. The cost conversion table 184 comprises a URL cost conversion table 184a and an e-mail cost conversion table 184b. The URL cost conversion table 184a stores a cost per access event at the time access is gained to Web sites which are designated as regulated URLs by the URL filtering unit 111. The e-mail cost conversion table 184b stores a cost per e-mail transmission event at the time an e-mail message designated as a regulated message (policy violation) by the e-mail filtering unit 112 is transmitted.

In FIG. 4, flows of information transferred between the various devices are indicated by the arrows. Specifically, flows of HTTP access requests are indicated by the solid-line arrows, flows of transmitted e-mail messages by the broken-line arrows, flows of collected history information by the dot-and-dash-line arrows, flows of acquisition of cost information (the permitted costs and the incurred costs) by the dotted-line arrows, and a flow of the transmission of a message view by the two-dot-and-dash-line arrow.

An HTTP access request outputted from the Web browser 141a of the client 141 is transferred to the Internet access limiter 121 of the cost-linked control server 120. If the HTTP access request is granted by the Internet access limiter 121, then the HTTP access request is transferred to the URL filtering unit 111 of the filtering server 110. If the HTTP access request is granted by the URL filtering unit 111, then the HTTP access request is transferred via the firewall server 150 to the mail/proxy server 160. The HTTP access request is then sent from the mail/proxy server 160 via the firewall server 150 to another Web server or the like on the Internet 30.

An e-mail message sent from the mailer 141b of the client 141 for another computer on the Internet 30 is transferred to the e-mail transmission limiter 131 of the groupware server 130. If the transmission of the e-mail message is granted by the e-mail transmission limiter 131, then the e-mail message is transferred to the e-mail filtering unit 112 of the filtering server 110. If the transmission of the e-mail message is granted by the e-mail filtering unit 112, then the e-mail message is transferred via the firewall server 150 to the mail/proxy server 160. The e-mail message is then sent from the mail/proxy server 160 via the firewall server 150 to another mail server or the like on the Internet 30.

The access history information 171 stored in the filtering log server 170 is collected by the incurred cost calculator 182 of the cost information server 180. The mail transmission history information 113 stored in the filtering server 110 is also collected by the incurred cost calculator 182 of the cost information server 180.

The cost information (the permitted costs and the incurred costs) stored in the information table 183 of the cost information server 180 is acquired by the Internet access limiter 121 which has received an HTTP access request and the e-mail transmission limiter 131 which has received an e-mail message to be transmitted.

The message view generated by the Web server daemon 122 of the cost-linked control server 120 is transferred from the Web server daemon 122 to the Web browser 141a of the client 141.

FIG. 5 shows the corporate information table 183a in the information table 183 by way of example. As shown in FIG. 5, the corporate information table 183a stores information (the number of employees, the names of the departments, etc.) of a corporation which has introduced a private use cost control system, a permitted cost, an incurred cost, regulated URL access history information, e-mail transmission policy violation history information, etc.

The information of the corporation includes the location, the telephone number, the capital, the number of employees, the stocks, the number of factories/offices, the date of establishment, the number of stock holders, the names of the departments, the average wage per hour (per person), the permitted time for private use (per person), the number of yearly labor days (per person), and the number of monthly labor days (per person).

The location is represented by "〒 xxx-xxxx yy-zz-ww, xxx cho, xxx ku, Tokyo". The telephone number is represented by "03-xxxx-xxxx". The capital is represented by "xx,xxx (million yen)". The number of employees is represented by "3456". The stocks are represented by "listed". The number of factories/offices is represented by "70". The date of establishment is represented by "xx, 19xx". The number of stock holders is represented by "1234". The names of the departments are represented by "Department 1, Department 2, . . . , Department n".

The blank for the average wage per hour (per person) contains an average wage calculated by the labor union of the corporation. In the example shown in FIG. 5, the average wage per hour is 1,200 yen.

The blank for the permitted time for private use (per person) contains a permitted time for private use of the Internet per employee. In the example shown in FIG. 5, each employee is permitted to use the Internet privately for 30 minutes (0.5 hour) per day.

The blank for the number of yearly labor days (per person) contains the number of yearly labor days presented by the labor union of the corporation. In the example shown in FIG. 5, the number of yearly labor days is 220.

The blank for the number of monthly labor days (per person) contains the number of monthly labor days per employee of the corporation. In this embodiment, the number of monthly labor days is set to a value produced by dividing the number of yearly labor days per person by 12 months. In the example shown in FIG. 5, the number of monthly labor days is 18.3.

A corporate domain name is represented by the domain name of a server which manages the home page of the corporation. In the example shown in FIG. 5, "a.co.jp" is used as the corporate domain name.

Cost information per common unit period, i.e., the permitted cost and the incurred cost, is presented in the corporation information table 183a. In the present embodiment, the costs are calculated each month.

The blank for the monthly permitted cost contains the cost permitted by the corporation for monthly private use of the Internet. The monthly permitted cost is represented by information calculated by the permitted cost calculator 181. In the example shown in FIG. 5, the monthly permitted cost is 37 million yen.

The blank for the monthly incurred cost contains the cost incurred by monthly private use of the Internet in the corporation. The monthly incurred cost is represented by information calculated by the incurred cost calculator 182. In the example shown in FIG. 5, the monthly incurred cost is 25 million 200 yen.

The blanks for the regulated URL access history information contain the numbers of access events for the types of regulated URLs that have been designated as regulated contents by the corporation. In each blank, the number of today's access events and the number of monthly access events (numerical value in parentheses) are stored. The times to start and end counting access events in one day can be selected as desired. For example, one day may be 24 hours beginning from 0 AM of the day, or may be 24 hours beginning from another time (e.g., 4 AM) of the day. By shifting the time to start counting access events, the number of access events counted after 0 AM in overtime work after midnight can be added to the number of access events counted for the previous day. In this manner, the number of access events in one day from the time when the employee goes into the office to the time when the employee leaves the office can be obtained (based on the assumption that the employee leaves the office before the public transportation system stops its daily operation).

The types of regulated URLs include travel, sports, job search, entertainment, vehicles, and non-traditional religion. In the example shown in FIG. 5, the number of access events to travel for today is 0, and the number of access events to travel for the present month is 20314. The number of access events to sports for today is 2, and the number of access events to sports for the present month is 21055. The number of access events to job search for today is 0, and the number of access events to job search for the present month is 961. The number of access events to entertainment for today is 3, and the number of access events to entertainment for the present month is 19968. The number of access events to vehicles for today is 0, and the number of access events to vehicles for the present month is 35434. The number of access events to non-traditional religion for today is 0, and the number of access events to non-traditional religion for the present month is 190.

The blanks for the e-mail transmission policy violation history information contain the numbers of violations of the types of policies by the monthly transmission of e-mail messages of the corporation. In each blank, the number of daily violations and the number of monthly violations (numerical value in parentheses) are stored. The times to start and end counting policy violations in one day can be selected as desired in the same manner as with the regulated URL access history information.

The types of policies include leakage of confidential information, use of a slanderous word, forgetting to send a copy (cc) to a supervisor, forgetting to mark "confidential" on a confidential document, and transmission of image data outside the corporation. In the example shown in FIG. 5, the number of times that confidential information is leaked is 0 for today and 0 for the present month. The number of times that a slanderous word is used is 0 for today and 0 for the present month. The number of times that sending a copy (cc) to a supervisor is forgotten is 1 for today and 1420 for the present month. The number of times that marking "confidential" on a confidential document is forgotten is 1 for today and 130 for the present month. The number of times that image data is transmitted outside the corporation is 0 for today and 221 for the present month.

FIG. 6 shows the department information table 183$b$ in the information table 183 by way of example. The department information table 183$b$ is prepared for each of the departments whose names are presented in the corporation information table 183$a$. The department information table 183$b$ contains information relative to its department (the number of members, the employee Nos. of the members, the department domain name), the permitted cost, the incurred cost, the regulated URL access history information, the e-mail transmission policy violation history information, etc. In FIG. 6, the corresponding items of information of the "department 2" are stored in the department information table 183$b$.

In the example shown in FIG. 6, the number of members in the department is 234, and the employee Nos. of the members are represented by 0004, 0016, . . . , 3321, . . . . The department domain name is "bumon-2.a.co.jp".

Cost information per common unit period, i.e., the permitted cost and the incurred cost, is presented in the department information table 183$b$. In the present embodiment, the costs are calculated each month.

The blank for the monthly permitted cost contains the cost permitted by the department for monthly private use of the Internet. The monthly permitted cost is represented by information calculated by the permitted cost calculator 181. In the example shown in FIG. 6, the monthly permitted cost is 2.5 million yen.

The blank for the monthly incurred cost contains the cost incurred by monthly private use of the Internet in the department. The monthly incurred cost is represented by information calculated by the incurred cost calculator 182. In the example shown in FIG. 6, the monthly incurred cost is 2 million 200 yen.

The blanks for the regulated URL access history information contain the numbers of access events for the types of regulated URLs in the department. In each blank, the number of today's access events and the number of monthly access events (numerical value in parentheses) are stored. The times to start and end counting access events in one day can be selected as desired in the same manner as with the corporation information table 183$a$.

The types of regulated URLs include travel, sports, job search, entertainment, vehicles, and non-traditional religion. In the example shown in FIG. 6, the number of access events to travel for today is 0, and the number of access events to travel for the present month is 1919. The number of access events to sports for today is 2, and the number of access events to sports for the present month is 2416. The number of access events to job search for today is 0, and the number of access events to job search for the present month is 131. The number of access events to entertainment for today is 3, and the number of access events to entertainment for the present month is 1067. The number of access events to vehicles for today is 0, and the number of access events to vehicles for the present month is 1854. The number of access events to non-traditional religion for today is 0, and the number of access events to non-traditional religion for the present month is 11.

The blanks for the e-mail transmission policy violation history information contain the numbers of violations of the types of policies by the monthly transmission of e-mail messages of the department. In each blank, the number of daily violations and the number of monthly violations (numerical value in parentheses) are stored. The times to start and end counting policy violations in one day can be selected as desired in the same manner as with the regulated URL access history information.

The types of policies include leakage of confidential information, use of a slanderous word, forgetting to send a copy (cc) to a supervisor, forgetting to mark "confidential" on a confidential document, and transmission of image data outside the corporation. In the example shown in FIG. 6, the number of times that confidential information is leaked is 0 for today and 0 for the present month. The number of times that a slanderous word is used is 0 for today and 0 for the present month. The number of times that sending a copy (cc) to a supervisor is forgotten is 1 for today and 172 for the present month. The number of times that marking "confidential" on a confidential document is forgotten is 1 for today and 8 for the present month. The number of times that image data is transmitted outside the corporation is 0 for today and 9 for the present month.

FIG. 7 shows an example of the employee information table 183$c$ in the information table 183. The employee information table 183$c$ is prepared for each of the employee's Nos. in the blanks of the employee's Nos. in the department information table 183$b$. The employee information table 183$c$ contains information relative to its employee (the name, the department to which the employee belongs, etc.), information relative to the client used by the employee, the permitted cost, the incurred cost, the regulated URL access history information, the e-mail transmission policy violation history information, etc. In the example shown in FIG. 7, the name represented by the information relative to its employee is "Yamada Taro", and the department represented by the same information and to which the employee belongs is the "department 2".

The information relative to the client includes the name of the client host, the IP address of the client host, the e-mail address, etc. In the example shown in FIG. 7, the name of the client host is "tyamada.bumon-2.a.co.jp", the IP address of the client host is "10.3.1.24", and the e-mail address is "tyamada@bumon-2.a.co.jp".

Cost information per common unit period, i.e., the permitted cost and the incurred cost, is presented in the employee information table 183$c$. In the present embodiment, the costs are calculated each month.

The blank for the monthly permitted cost contains the cost permitted for monthly private use of the Internet by the employee. In the example shown in FIG. 7, the monthly permitted cost is ten thousand yen.

The blank for the monthly incurred cost contains the cost incurred by monthly private use of the Internet by the employee. In the example shown in FIG. 7, the monthly incurred cost is 67 hundred yen.

The blanks for the regulated URL access history information contain the numbers of access events made by the employee for the types of regulated URLs. In each blank, the number of today's access events and the number of monthly access events (numerical value in parentheses) are stored. The times to start and end counting access events in one day can be selected as desired in the same manner as with the corporation information table 183a.

The types of regulated URLs include travel, sports, job search, entertainment, vehicles, and non-traditional religion. In the example shown in FIG. 7, the number of access events to travel for today is 0, and the number of access events to travel for the present month is 6. The number of access events to sports for today is 2, and the number of access events to sports for the present month is 5. The number of access events to job search for today is 0, and the number of access events to job search for the present month is 0. The number of access events to entertainment for today is 3, and the number of access events to entertainment for the present month is 8. The number of access events to vehicles for today is 0, and the number of access events to vehicles for the present month is 3. The number of access events to non-traditional religion for today is 0, and the number of access events to non-traditional religion for the present month is 0.

The blanks for the e-mail transmission policy violation history information contain the numbers of violations of the types of policies by the monthly transmission of e-mail messages of the employee. In each blank, the number of daily violations and the number of monthly violations (numerical value in parentheses) are stored. The times to start and end counting policy violations in one day can be selected as desired in the same manner as with the regulated URL access history information.

The types of policies include leakage of confidential information, use of a slanderous word, forgetting to send a copy (cc) to a supervisor, forgetting to mark "confidential" on a confidential document, and transmission of image data outside the corporation. In the example shown in FIG. 7, the number of times that confidential information is leaked is 0 for today and 0 for the present month. The number of times that a slanderous word is used is 0 for today and 0 for the present month. The number of times that sending a copy (cc) to a supervisor is forgotten is 1 for today and 3 for the present month. The number of times that marking "confidential" on a confidential document is forgotten is 1 for today and 1 for the present month. The number of times that image data is transmitted outside the corporation is 0 for today and 0 for the present month.

FIG. 8 shows an example of the URL cost conversion table 184a in the cost conversion table 184. The URL cost conversion table 184a has a column of "types of regulated sites" and a column of "costs (losses)". Items of information that are horizontally aligned with each other in the URL cost conversion table 184a are associated with each other. The column of "types of regulated sites" contains the types of sites designated as regulated contents against access by the filtering server 110, and the column of "costs (losses)" contains the costs incurred when sites (home pages) belonging to the types of the regulated sites are accessed. The costs are in yen.

In the example shown in FIG. 8, the cost of 100 yen is imposed on one access event to a site belonging to the type "travel". The cost 100 yen is imposed on one access event to a site belonging to the type "sports". The cost of 50 yen is imposed on one access event to a site belonging to the type "job search". The cost of 200 yen is imposed on one access event to a site belonging to the type "entertainment". The cost of 200 yen is imposed on one access event to a site belonging to the type "vehicles". The cost of 500 yen is imposed on one access event to a site belonging to the type "non-traditional religion".

The system administrator determines as desired how much cost should be imposed on access to a regulated site type depending on the policies and empirical rules of the corporation. For example, if the corporation recommends that its employee should be refreshed by travelling periodically according to its policies, then the cost imposed on access to a site belonging to the type "travel" may be set to a lower level.

FIG. 9 shows an example of the e-mail cost conversion table 184b in the cost conversion table 184. The e-mail cost conversion table 184b has a column of "types of policy violations" and a column of "costs (losses)". Items of information that are horizontally aligned with each other in the e-mail cost conversion table 184b are associated with each other. The column of "types of policy violations" contains the types of policy violations of e-mail messages defined in the filtering server 110, and the column of "costs (losses)" contains the costs incurred when the types of policy violations are committed. The costs are in yen.

In the example shown in FIG. 9, the cost imposed when the policy violation of the "leakage of confidential information" is committed is the same amount as the "permitted cost (the monthly permitted cost in the employee information table)". The cost imposed when the policy violation of the "use of a slanderous word" is committed is 1000 yen. The cost imposed when the policy violation of the "forgetting to send a copy (cc) to a supervisor" is committed is 100 yen. The cost imposed when the policy violation of the "forgetting to mark "confidential" on a confidential document" is committed is 100 yen. The cost imposed when the policy violation of the "transmission of image data outside the corporation" is committed is 100 yen.

The system administrator determines as desired how much cost should be imposed on a policy violation depending on the policies and empirical rules of the corporation. For example, in the example shown in FIG. 9, a relatively large cost of 1000 yen is imposed on one policy violation of the "use of a slanderous word" because such a policy violation is considered to disrupt a teamwork and have a large effect on the entire group of employees. The "permitted cost" (upper limit) is imposed on one policy violation of the "leakage of confidential information", inhibiting the use of e-mail because such a policy violation is considered to have a large risk on the organization.

FIG. 10 shows the access history information 171 by way of example. In the example shown in FIG. 10, the access history information 171 has columns of "date", "time", "requesting source", "access destination", "IP address", and "category". Items of information that are horizontally aligned with each other in the access history information 171 are associated with each other.

The column of "date" contains accessing dates. The column of "time" contains accessing times. The column of "requesting source" contains the IP addresses of clients which have outputted access requests. The column of "access destination" contains the URLs of access destinations indicated by access requests. The column of "IP address" contains the IP addresses of servers of access destinations. The column of "category" contains the categories (types) of sites of access destinations. The category of a site to which access is attempted makes it possible to determine whether the site is a regulated Web site or not.

In the example shown in FIG. 10, an access request is outputted from a client having an IP address "10.3.1.24" to a site "www.f.com" (IP address "xxx.xxx.xxx.xxx") belonging to the category of "sports" at 10 o'clock 15 minutes 32 seconds on Oct. 18, 2001, and an access request is outputted from a client having an IP address "10.3.1.24" to a site "www.z.com" (IP address "zzz.zzz.zzz.zzz") belonging to the category of "job search" at 10 o'clock 15 minutes 34 seconds on Oct. 18, 2001.

FIG. 11 shows an example of the mail transmission history information 113 by way of example. The mail transmission history information 113 has columns of "transmission date and time", "sender address", "receiver, simultaneous recipient address", "mail title", "mail text", and "policy violation". Items of information that are horizontally aligned with each other in the mail transmission history information 113 are associated with each other. The column of "transmission date and time" contains dates and times when e-mail messages are sent. The column of "sender address" contains the mail addresses of senders. The column of "receiver, simultaneous recipient address" contains the mail addresses of receivers and recipients. The column of "mail title" contains the titles of e-mail messages. The column of "mail text" contains the texts of e-mail messages, including header information and attachment files. The column of "policy violation" contains information as to whether there is a policy violation about the limitation of the transmission of an e-mail message, and the type of a policy that is applied if there is a policy violation.

In the example shown in FIG. 11, an e-mail message having a title of "Regarding the request to manufacture parts" is sent from a sender "tyamada@bumon-2.co.jp" to a receiver "hiraga@bumon-2.co.jp" and a simultaneous recipient "butyou@bumon-2.co.jp" at 15 o'clock 43 minutes 52 seconds on Oct. 18, 2001. This e-mail message is not in violation of a policy. An e-mail message having a title of "Regarding the meeting about product specifications" is sent from a sender "tyamada@bumon-2.co.jp" to a receiver "aaa@bumon-2.co.jp" at 15 o'clock 55 minutes 03 seconds on Oct. 18, 2001. This e-mail message is in violation of the policy "forgetting to send a copy (cc) to a supervisor".

Communications of contents are limited based on the cost according to the above system arrangement and data. A filtering process based on the cost in the present embodiment will be described below.

Figure 12:
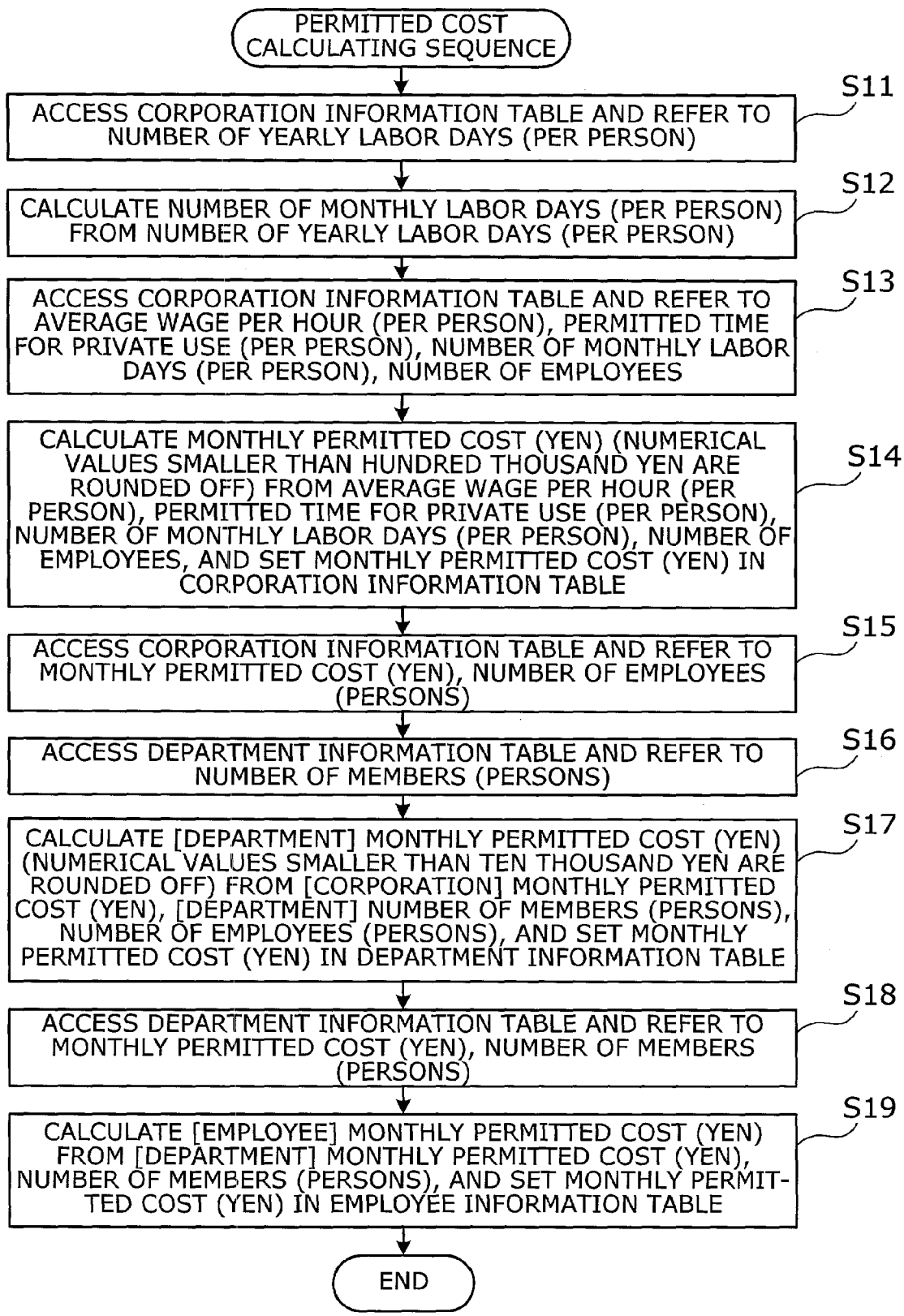
FIG. 12 is a flowchart of a permitted cost calculating sequence.

FIG. 12 is a flowchart of a permitted cost calculating sequence. The permitted cost calculating sequence is a process periodically carried out by the permitted cost calculator 181 of the cost information server 180. In the present embodiment, the permitted cost calculator 181 executes the permitted cost calculating sequence at a given time (e.g., 0 AM) everyday. The permitted cost calculating sequence shown in FIG. 12 will be described below with respect to step numbers.

[Step S11]

The permitted cost calculator 181 accesses the corporation information table 183a and refers to the number of yearly labor days per person.

[Step S12]

The permitted cost calculator 181 calculates the number of monthly labor days (per person) from the number of yearly labor days (per person), and sets the number of monthly labor days (per person) in the corporation information table 183a.

For example, the permitted cost calculator 181 can determine the number of monthly labor days per person by calculating "the number of monthly labor days (days/person)=the number of yearly labor days (days/person)÷12 (months)=220 (persons/day)÷12 (months)=18.3 (days/person).

[Step S13]

The permitted cost calculator 181 accesses the corporation information table 183a, and refers to the average wage per hour (per person), the permitted time for private use (per person), the number of monthly labor days (per person), and the number of employees.

[Step S14]

The permitted cost calculator 181 calculates a monthly permitted cost (yen) (the numerical values smaller than hundred thousand yen are rounded off) from the average wage per hour (per person), the permitted time for private use (per person), the number of monthly labor days (per person), and the number of employees, and sets the monthly permitted cost in the corporation information table 183a.

For example, the permitted cost calculator 181 can determine the monthly permitted cost in the corporation by calculating "[corporation] monthly permitted cost (yen)=the average wage per hour (per person)×the permitted time for private use (per person)×the number of monthly labor days (per person)×the number of employees=1,200 (yen/hour·person)×0.5 (hour/day·person)×18.3 (days/person)×3,456 (persons)=37,000,000 (yen)".

[Step S15]

The permitted cost calculator 181 accesses the corporation information table 183a, and refers to the monthly permitted cost (yen) and the number of employees.

[Step S16]

The permitted cost calculator 181 accesses the department information table 183b, and refers to the number of members (persons).

[Step S17]

The permitted cost calculator 181 calculates a [department] monthly permitted cost (yen) for each department (the numerical values smaller than ten thousand yen are rounded off) from the [corporation] monthly permitted cost (yen), the [department] number of members (persons), and the number of employees (persons), and sets the monthly permitted cost (yen) in each department information table 183b.

For example, the permitted cost calculator 181 can determine the monthly permitted cost for each department by calculating the "[department] monthly permitted cost (yen)=the [corporation] monthly permitted cost (yen)×(the [department] number of members (persons)÷the number of employees (persons))=37,000,000 (yen)×(234 (persons)×3,456 (persons))=25,000,000 (yen).

[Step S18]

The permitted cost calculator 181 accesses the department information table 183b of each department, and refers to the monthly permitted cost (yen) and the number of members (persons).

[Step S19]

The permitted cost calculator 181 calculates an [employee] monthly permitted cost (yen) for each employee belonging to each department (the numerical values smaller than one thousand yen are rounded off) from the [department] monthly permitted cost (yen) and the number of members (persons) of each department, and sets the monthly permitted cost (yen) in the employee information table 183c of each employee.

For example, the permitted cost calculator 181 can determine the monthly permitted cost for each employee by calculating the "[employee] monthly permitted cost (yen)= [department] monthly permitted cost (yen)÷the number of members (persons)=25,000,000 (yen)÷234 (persons)=10, 000 (yen)".

In the example shown in FIG. 12, the permitted cost is calculated from the relationship between the wage (salary) of the employees working for the corporation (juridical person) and the number of labor days from the standpoint of a loss (cost) of productivity. However, the permitted cost can be calculated more essentially from the standpoint of fruits (sales and profits of the corporation) produced by the working of the employees. Which information is used to calculate the permitted cost depends on the policies of the corporation.

Figure 13:
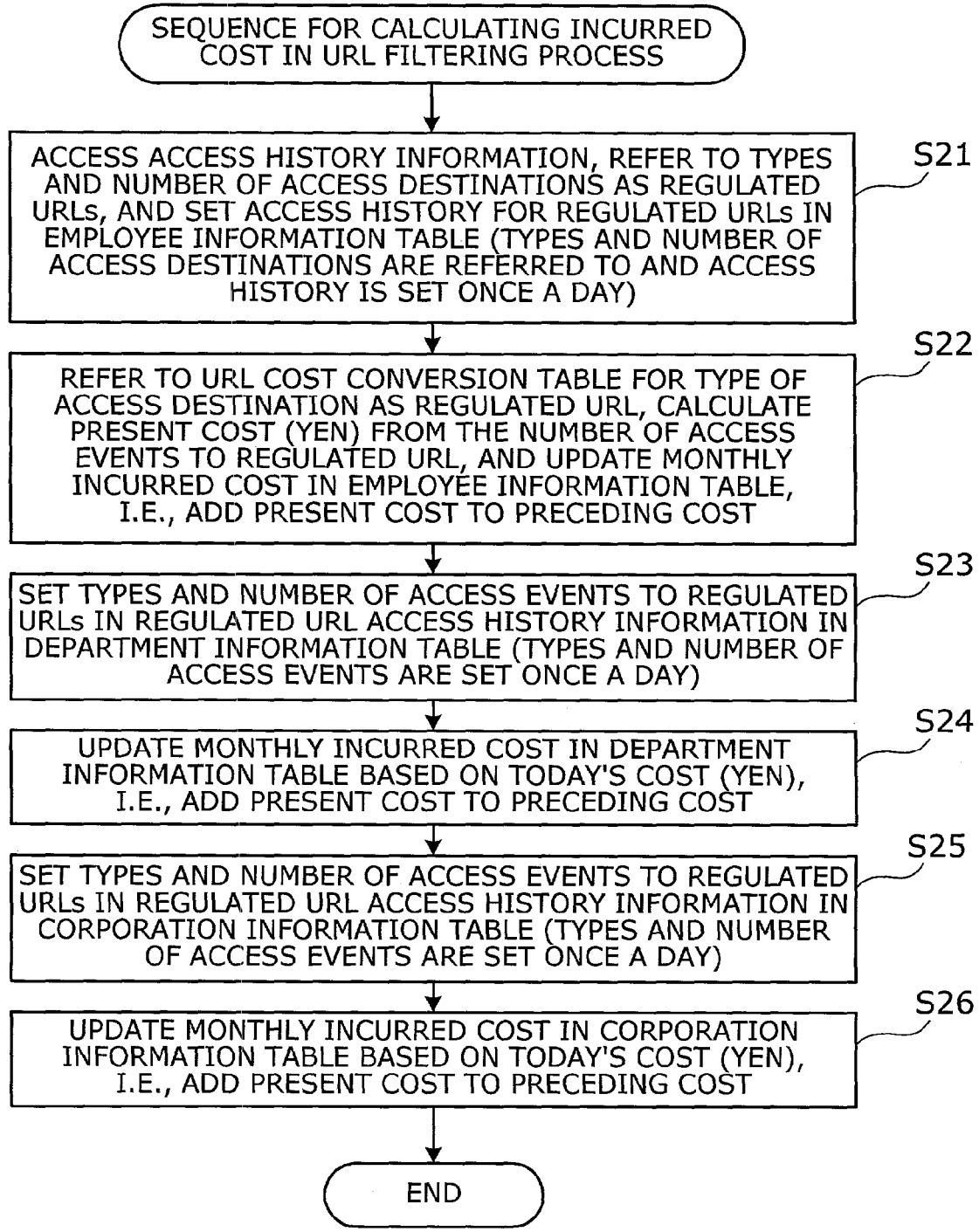
FIG. 13 is a flowchart of an incurred cost calculating sequence in a URL filtering process.

FIG. 13 is a flowchart of an incurred cost calculating sequence in the URL filtering process. The incurred cost calculating sequence is a process carried out by the incurred cost calculator 182 of the cost information server 180. The incurred cost calculating sequence shown in FIG. 13 will be described below with respect to step numbers.

[Step S21]

The incurred cost calculator 182 accesses the access history information 171 in the filtering log server 170, refers to the types and number (the number of access events is calculated for each type) of access destinations as regulated URLs for each employee, and sets the value of an access history for regulated URLs in the employee information table 183c of each employee (the types and number of access destinations are referred to and the value of an access history is set once a day).

For example, if an employee accesses a sports site twice, then 2 (events) is set in the blank of the sports (present cycle) in the regulated URL access history information in the employee information table 183c of that employee. If the monthly total up to the preceding cycle in the blank of the sports is 3 (events), then the monthly total of access events for the sports is 3 (events)+2 (events)=5 (events).

Similarly, if an employee accesses an entertainment site three times, then 3 (events) is set in the blank of the entertainment (present cycle) in the regulated URL access history information in the employee information table 183c of that employee. If the monthly total of access events up to the preceding cycle in the blank of the entertainment is 5 (events), then the monthly total of access events for the entertainment is 5 (events)+3 (events)=8 (events).

[Step S22]

The incurred cost calculator 182 refers to the URL cost conversion table 184a for the type of an access destination as a regulated URL, calculates a present cost (yen) from the number of access events to the regulated URL, and updates the monthly incurred cost in the employee information table 183c, i.e., adds the present cost to the preceding cost.

For example, the URL cost conversion table 184a shows that the cost imposed for accessing a sports site is 100 (yen) and the cost imposed for accessing an entertainment site is 200 (yen). If a sports site is accessed twice and an entertainment site is accessed three times, then the present cost (yen) is 2 (events)×100 (yen)+3 (events)×200 (yen)=800 (yen).

If the monthly incurred cost (yen) up to the preceding cycle is 5,700 (yen), then the total monthly incurred cost (yen) after the present cost is added is 5,700 (yen)+800 (yen)=6,500 (yen).

[Step S23]

The incurred cost calculator 182 sets the types and number of access events to regulated URLS, which have been acquired in step S21, in the regulated URL access history information in the department information table 183b of the department to which each employee belongs (the types and number of access events are set once a day).

For example, if an employee of a certain department accesses a sports site twice, then 2 (events) is set in the blank of the sports (present cycle) in the regulated URL access history information in the department information table 183b of that department. If the monthly total of access events up to the preceding cycle in the blank of the sports is 2414 (events), then the updated monthly total of access events for the sports is 2414 (events)+2 (events)=2416 (events).

Similarly, if an employee of a certain department accesses an entertainment site three times, then 3 (events) is set in the blank of the entertainment (present cycle) in the regulated URL access history information in the department information table 183b of that department. If the monthly total of access events up to the preceding cycle in the blank of the entertainment is 1064 (events), then the updated monthly total of access events for the entertainment is 1064 (events)+3 (events)=1067 (events).

[Step S24]

The incurred cost calculator 182 updates the monthly incurred cost in the department information table 183b of the department to which the employee belongs, based on the present cost (yen) of the employee which is calculated in step S22, i.e., adds the present cost to the preceding cost.

For example, if the present cost (yen) is 800 (yen) and the monthly incurred cost (yen) up to the preceding cycle is 1,999,200 (yen), then the updated monthly incurred cost: (yen) is 1,999,200 (yen)+800 (yen)=2,000,000 (yen).

[Step S25]

The incurred cost calculator 182 sets the types and number of access events to regulated URLs which have been acquired in step S21 in the regulated URL access history information in the corporation information table 183a (the types and number of access events are set once a day).

For example, if an employee in a certain corporation accesses a sports site twice, then 2 (events) is set in the blank of the sports (present cycle) in the regulated URL access history information in the corporation information table 183a of that corporation. If the monthly total up to the preceding cycle in the blank of the sports is 21053 (events), then the monthly total of access events for the sports is 21053 (events)+2 (events)=21055 (events).

If an employee in a certain corporation accesses an entertainment site three times, then 3 (events) is set in the blank of the entertainment (present cycle) in the regulated URL access history information in the corporation information table 183a of that corporation. If the monthly total up to the preceding cycle in the blank of the entertainment is 19965 (events), then the monthly total of access events for the entertainment is 19965 (events)+3 (events)=19968 (events).

[Step S26]

The incurred cost calculator 182 updates the monthly incurred cost in the corporation information table 183a based on the today's costs (yen) calculated in step S22, i.e., adds the present cost to the preceding cost.

For example, if the present cost (yen) is 800 (yen) and the monthly incurred cost (yen) up to the preceding cycle is 24,999,200 (yen), then the updated monthly incurred cost (yen) is 24,999,200 (yen)+800 (yen)=25,000,000 (yen).

Figure 14:
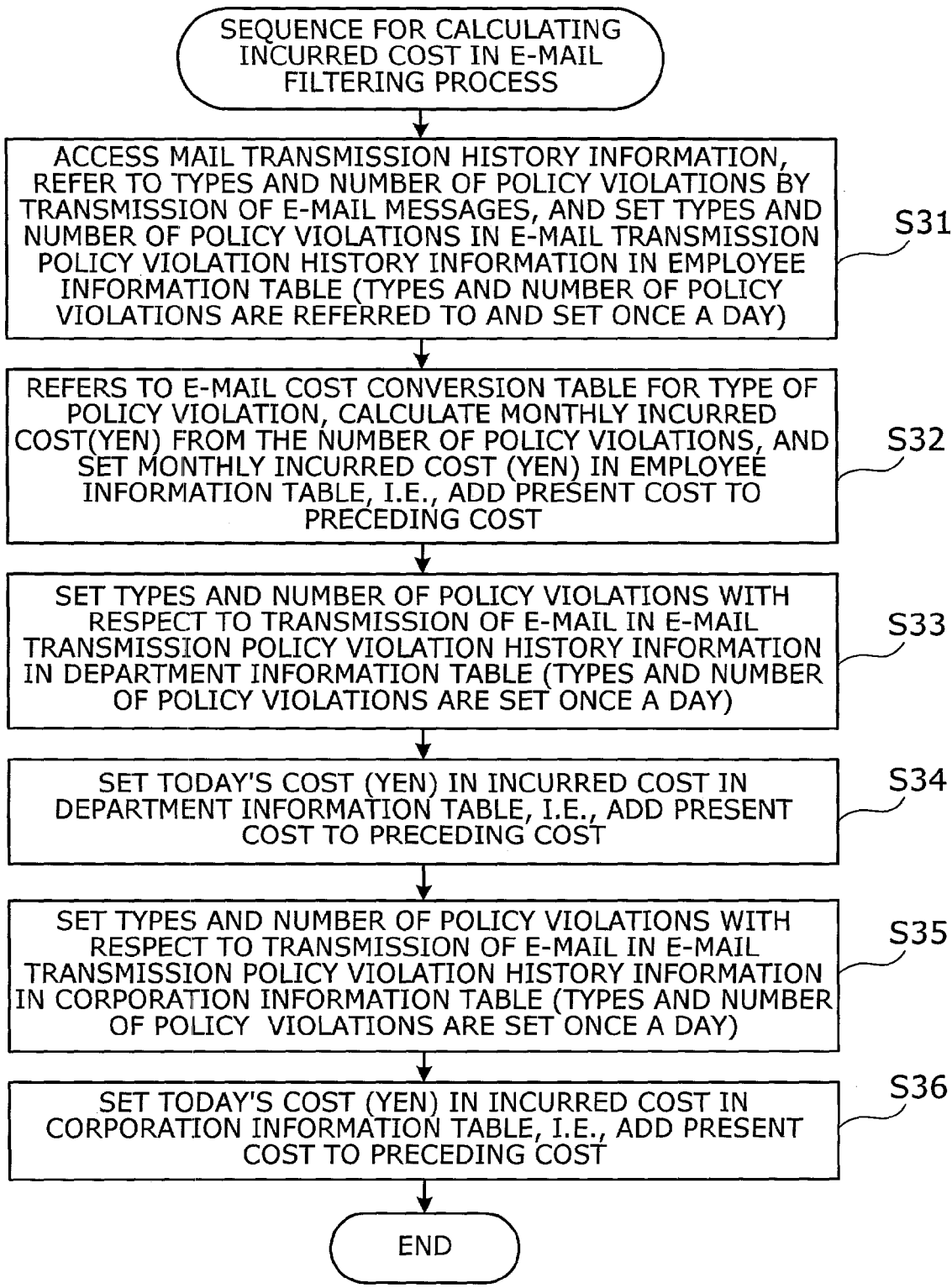
FIG. 14 is a flowchart of an incurred cost calculating sequence in an e-mail filtering process.

FIG. 14 is a flowchart of an incurred cost calculating sequence in the e-mail filtering process. The incurred cost calculating sequence is a process carried out by the incurred cost calculator 182 of the cost information server 180. The incurred cost calculating sequence shown in FIG. 14 will be described below with respect to step numbers.

[Step S31]

The incurred cost calculator 182 accesses the mail transmission history information 113 in the e-mail filtering unit 112, acquires the types and number (the number of policy violations is calculated for each type) of policy violations by the transmission of e-mail, and sets the types and number of policy violations in the e-mail transmission policy violation history information in the employee information table 183c (the types and number of policy violations are referred to and set once a day).

For example, if an employee commits one policy violation of forgetting (present cycle) to send a copy (cc) to a supervisor, then 1 (event) is set in the blank (present cycle) of the forgetting to send a copy (cc) to a supervisor in the e-mail transmission policy violation history information in the employee information table 183c of that employee. If the monthly total up to the preceding cycle in the blank of the forgetting to send a copy (cc) to a supervisor is 2 (events), then the updated monthly total (events) in the blank of the forgetting to send a copy (cc) to a supervisor is 2 (events)+1 (event)=3 (events).

If an employee commits one policy violation of forgetting (present cycle) to mark "confidential" on a confidential document, then 1 (event) is set in the blank (the monthly total up to the preceding cycle) of the forgetting to mark "confidential" on a confidential document in the e-mail transmission policy violation history information in the employee information table 183c of that employee. If the monthly total up to the preceding cycle in the blank of the forgetting to mark "confidential" on a confidential document is 0 (event), then the updated monthly total (events) in the blank of the forgetting to mark "confidential" on a confidential document is 0 (event)+1 (event)=1 (event).

[Step S32]

The incurred cost calculator 182 refers to the e-mail cost conversion table 184b for the type of a policy violation, calculates a monthly incurred cost (yen) from the number of policy violations, and updates the monthly incurred cost (yen) in the employee information table 183c, i.e., acids the present cost to the preceding cost.

For example, the e-mail cost conversion table 184b shows that the cost imposed for forgetting to send a copy (cc) to a supervisor is 100 (yen) and the cost imposed for forgetting to mark "confidential" on a confidential document is also 100 (yen). If one policy violation is committed by forgetting to send a copy (cc) to a supervisor and one policy violation is committed by forgetting to mark "confidential" on a confidential document, then the present cost (yen) is 1 (event)×100 (yen)+1 (event)×100 (yen)=200 (yen).

If the monthly incurred cost (yen) up to the preceding cycle is 6,500 (yen), then the total monthly incurred cost (yen) after the present cost is added is 6,500 (yen)+200 (yen)=6,700 (yen).

[Step S33]

The incurred cost calculator 182 sets the types and number of policy violations with respect to the transmission of e-mail, which have been acquired in step S31, in the e-mail transmission policy violation history information in the department information table 183b (the types and number of policy violations are set once a day).

For example, if an employee of a certain department commits one policy violation of forgetting to send a copy (cc) to a supervisor, then 1 (event) is set in the blank of the forgetting to send a copy (cc) to a supervisor in the e-mail transmission policy violation history information in the department information table 183b of that department. If the monthly total up to the preceding cycle of policy violations in the blank of the forgetting to send a copy (cc) to a supervisor is 171 (events), then the updated monthly total of policy violations of forgetting to send a copy (cc) to a supervisor is 171 (events)+1 (event)=172 (events).

Similarly, if an employee of a certain department commits one policy violation of forgetting to mark "confidential" on a confidential document, then 1 (event) is set in the blank of the forgetting to mark "confidential" on a confidential document in the e-mail transmission policy violation history information in the department information table 183b of that department. If the monthly total up to the preceding cycle of policy violations in the blank of the forgetting to mark "confidential" on a confidential document is 7 (events), then the updated monthly total of policy violations of forgetting to mark "confidential" on a confidential document is 7 (events)+1 (event)=8 (events).

[Step S34]

The incurred cost calculator 182 sets the today's cost (yen) of each employee which has been calculated in step S22 in the monthly incurred cost in the department information table 183b, i.e., adds the present cost to the preceding cost.

For example, if the present cost (yen) is 200 (yen) and the monthly incurred cost (yen) up to the preceding cycle is 2,000,000 (yen), then the updated monthly incurred cost (yen) is 2,000,000 (yen)+200 (yen)=2,000,200 (yen).

[Step S35]

The incurred cost calculator 182 sets the types and number of policy violations with respect to e-mail transmission, which have been acquired in step S31, in the e-mail transmission policy violation history information in the corporation information table 183a (the types and number of policy violations are referred to and set once a day).

For example, if an employee of a certain corporation commits one policy violation of forgetting to send a copy (cc) to a supervisor, then 1 (event) is set in the blank of the forgetting to send a copy (cc) to a supervisor in the e-mail transmission policy violation history information in the corporation information table 183a of that corporation. If the monthly total up to the preceding cycle of policy violations in the blank of the forgetting to send a copy (cc) to a supervisor is 1419 (events), then the updated monthly total of policy violations of forgetting to send a copy (cc) to a supervisor is 1419 (events)+1 (event)=1420 (events).

Similarly, if an employee of a certain corporation commits one policy violation of forgetting to mark "confidential" on a confidential document, then 1 (event) is set in the blank of the forgetting to mark "confidential" on a confidential document in the e-mail transmission policy violation history information in the corporation information table 183a of that department. If the monthly total up to the preceding cycle of policy violations in the blank of the forgetting to mark "confidential" on a confidential document is 129 (events), then the updated monthly total of policy violations of forgetting to mark "confidential" on a confidential document is 129 (events)+1 (event)=130 (events).

[Step S36]

The incurred cost calculator 182 sets the today's cost (yen) calculated in step S32 in the monthly incurred cost in the corporation information table 183a, i.e., adds the present cost to the preceding cost.

For example, if the present cost (yen) is 200 (yen) and the monthly incurred cost (yen) up to the preceding day is 25,000,000 (yen), then the updated monthly incurred cost: (yen) is 25,000,000 (yen)+200 (yen)=25,000,200 (yen).

Figure 15:
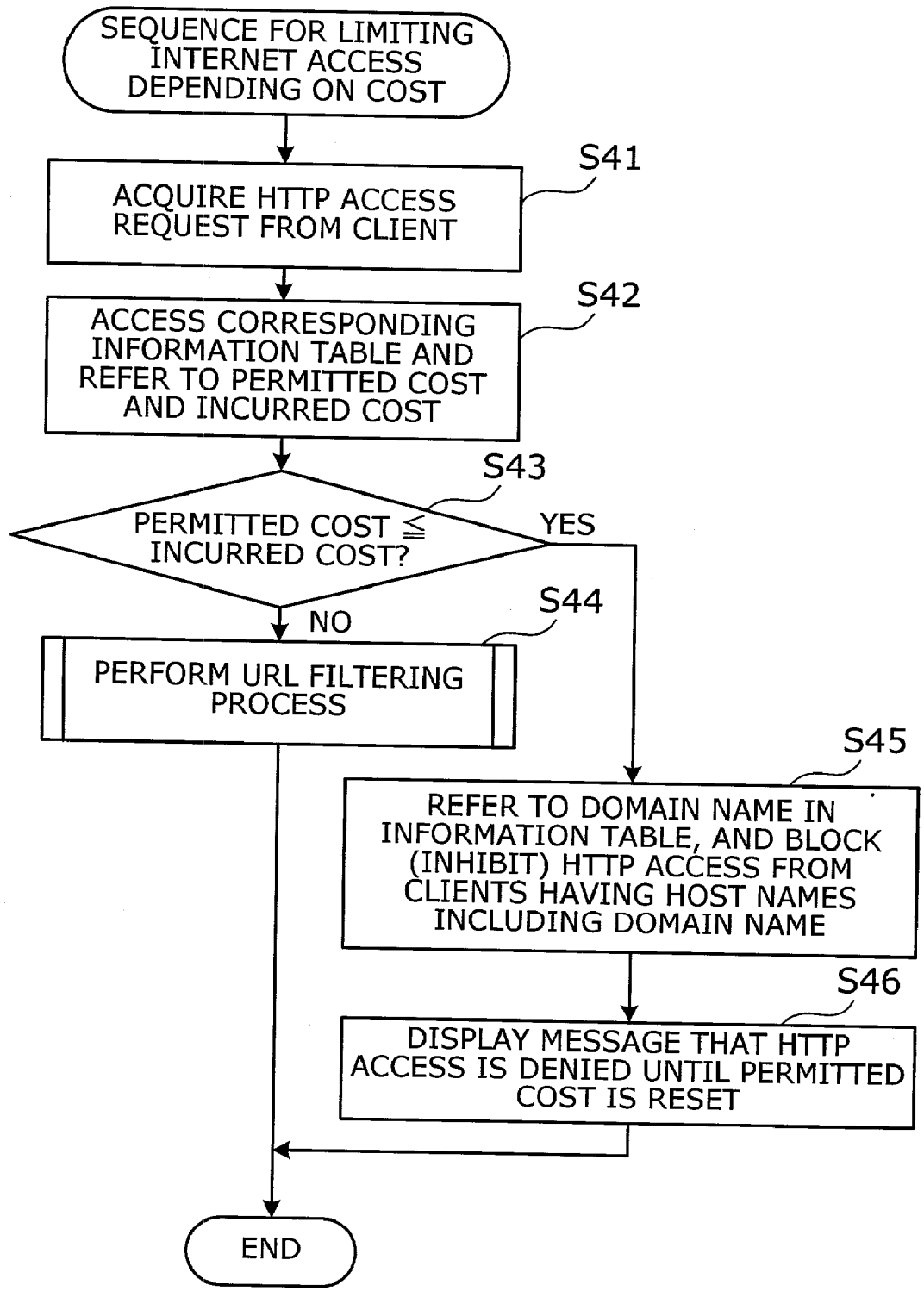
FIG. 15 is a flowchart of a sequence for limiting Internet access depending on the cost.

FIG. 15 is a flowchart of a sequence for limiting Internet access depending on the cost. The sequence shown in FIG. 15 will be described below with respect to step numbers.

[Step S41]

The Internet access limiter 121 acquires an HTTP access request from one of the clients 141, 142, 143, . . . .

[Step S42]

The Internet access limiter 121 accesses the information table 183 serving as a limitation determining reference, and refers to the permitted cost and the incurred cost. The information table 183 which serves as a limitation determining reference is the corporation information table 183a if managed in terms of corporations, the department information table 183b if managed in terms of departments, and the employee information table 183c if managed in terms of employees.

[Step S43]

The Internet access limiter 121 determines whether or not the incurred cost is equal to or higher than the permitted cost (the permitted cost the incurred cost). If the incurred cost is equal to or higher than the permitted cost, then the processing goes to step S45. If the incurred cost is lower than the permitted cost, then the Internet access limiter 121 transfers the HTTP access request acquired in step S41 to the filtering server 110, and then the processing goes to step S44.

[Step S44]

The filtering server 110 and the filtering log server 170 cooperate with each other to perform the URL filtering process. Details of the URL filtering process will be described later on. Thereafter, the sequence is put to an end.

[Step S45]

The Internet access limiter 121 refers to the domain name in the information table 183 serving as a limitation determining reference, and blocks HTTP access from those clients which include the domain name in their host names, i.e., does not permit HTTP access from those clients.

If the information table 183 serving as a limitation determining reference is the corporation information table 183a, then all HTTP access attempts from the clients having client host names (" . . . .a.co.jp") including the corporation domain name "a.co.jp" set in the corporation information table 183a are blocked. If the information table 183 serving as a limitation determining reference is the department information table 183b, then all HTTP access attempts from the clients having department domain names (e.g., client host names (" . . . .bumon-2.a.co.jp") including "bumon-2.a.co.jp") set in the department information table 183b are blocked. If the information table 183 serving as a limitation determining reference is the employee information table 183c, then all HTTP access attempts from the clients having client host names (e.g., "tyamada.bumon-2.a.co.jp") set in the employee information table 183c are blocked.

[step S46]

The Internet access limiter 121 transmits a message that HTTP access is denied until the permitted cost is reset to the Web browser of a client which has outputted the HTTP access request. The Web browser displays a message view indicating that HTTP access is denied.

Figure 16:
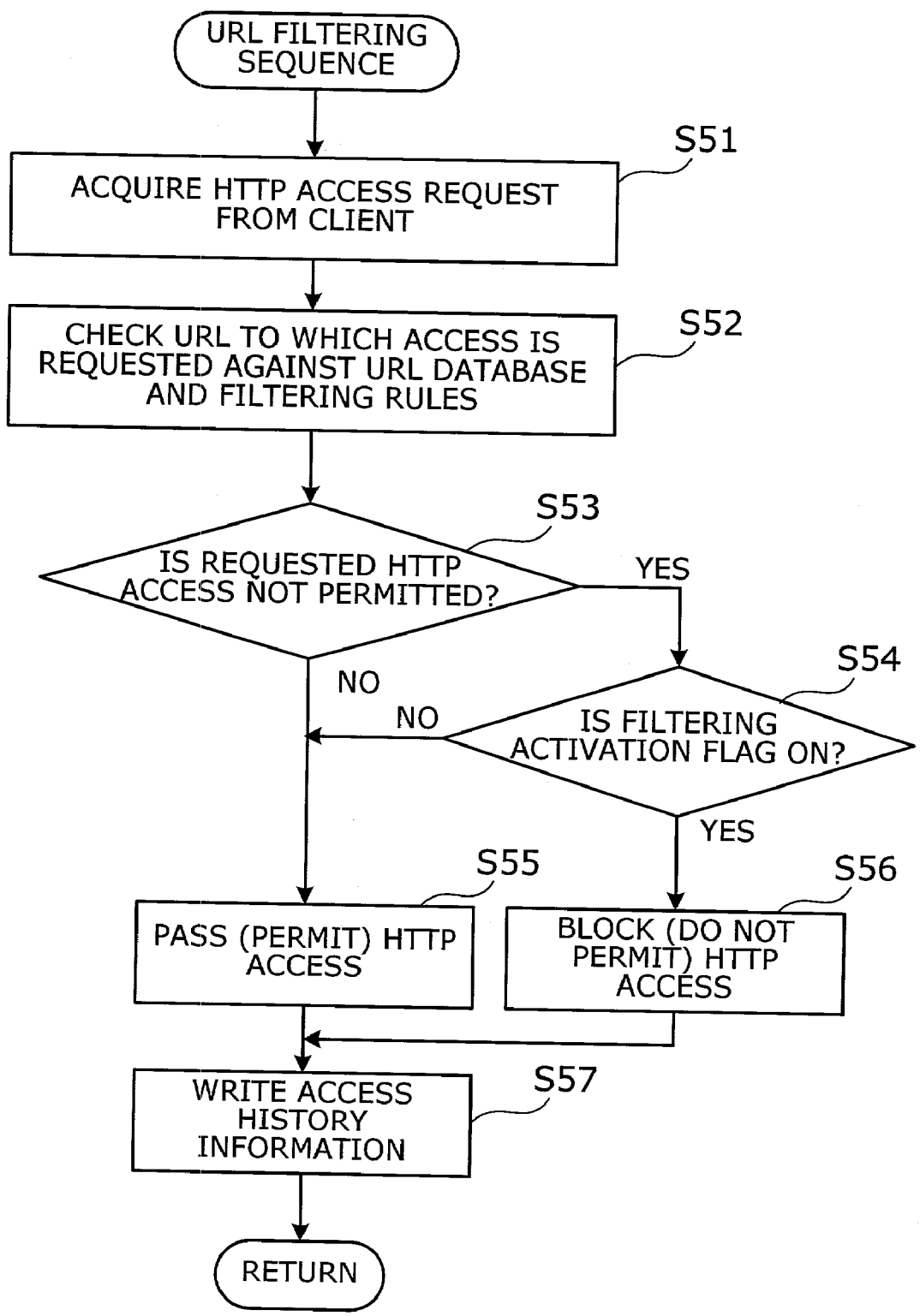
FIG. 16 is a flowchart of a URL filtering sequence.

FIG. 16 is a flowchart of the URL filtering sequence. The URL filtering sequence shown in FIG. 16 will be described below with respect to step numbers.

[Step S51]

The URL filtering unit 111 of the filtering server 110 acquires an HTTP access request from one of the clients 141, 142, 143, . . . via the cost-linked control server 120.

[Step S52]

The URL filtering unit 111 checks the URL to which access is requested, against a URL database (information representing a list of regulated URLs and the types of sites indicated by URLs) and filtering rules (information as to the permission and inhibition of access to each site type) which are held in the URL filtering unit 111 (also compares the URL with virtual hosts and mirror sites). The checking process may be a process of comparing IP addresses or a process of comparing domain names.

[Step S53]

The URL filtering unit 111 determines whether the requested HTTP access is HTTP access which is not permitted. If the requested HTTP access is HTTP access which is not permitted, then the processing goes to step S54. If the requested HTTP access is HTTP access which is permitted, then the processing goes to step S55.

[Step S54]

The URL filtering unit 111 determines whether the filtering activation flag is "ON" or not. If HTTP access to regulated sites is permitted until the incurred cost reaches the permitted cost, then the filtering activation flag is set to "OFF" at the same time that the information table 183 is initialized. If the filtering activation flag is "ON", then the processing goes to step S56, and if the filtering activation flag is "OFF", then the processing goes to step S55.

[Step S55]

The URL filtering unit 111 passes (permits) the HTTP access. Specifically, the URL filtering unit 111 transfers the acquired HTTP access request via the firewall server 150 to the mail/proxy server 160. The mail/proxy server 160 makes HTTP access via the Internet 30, and contents specified by the HTTP access request are transferred to the client which has outputted the HTTP access request. Thereafter, the processing goes to step S57.

[Step S56]

The URL filtering unit 111 blocks (does not permit) the HTTP access.

[Step S57]

The filtering log server 170 writes the result of the filtering process in the access history information 171. Specifically, the URL filtering unit 111 transfers the result of the filtering process (steps S52 through S56) depending on the HTTP access request to the filtering log server 170. The filtering log server 170 writes the received result in the access history information 171. Then, the sequence is put to an end.

Figure 17:
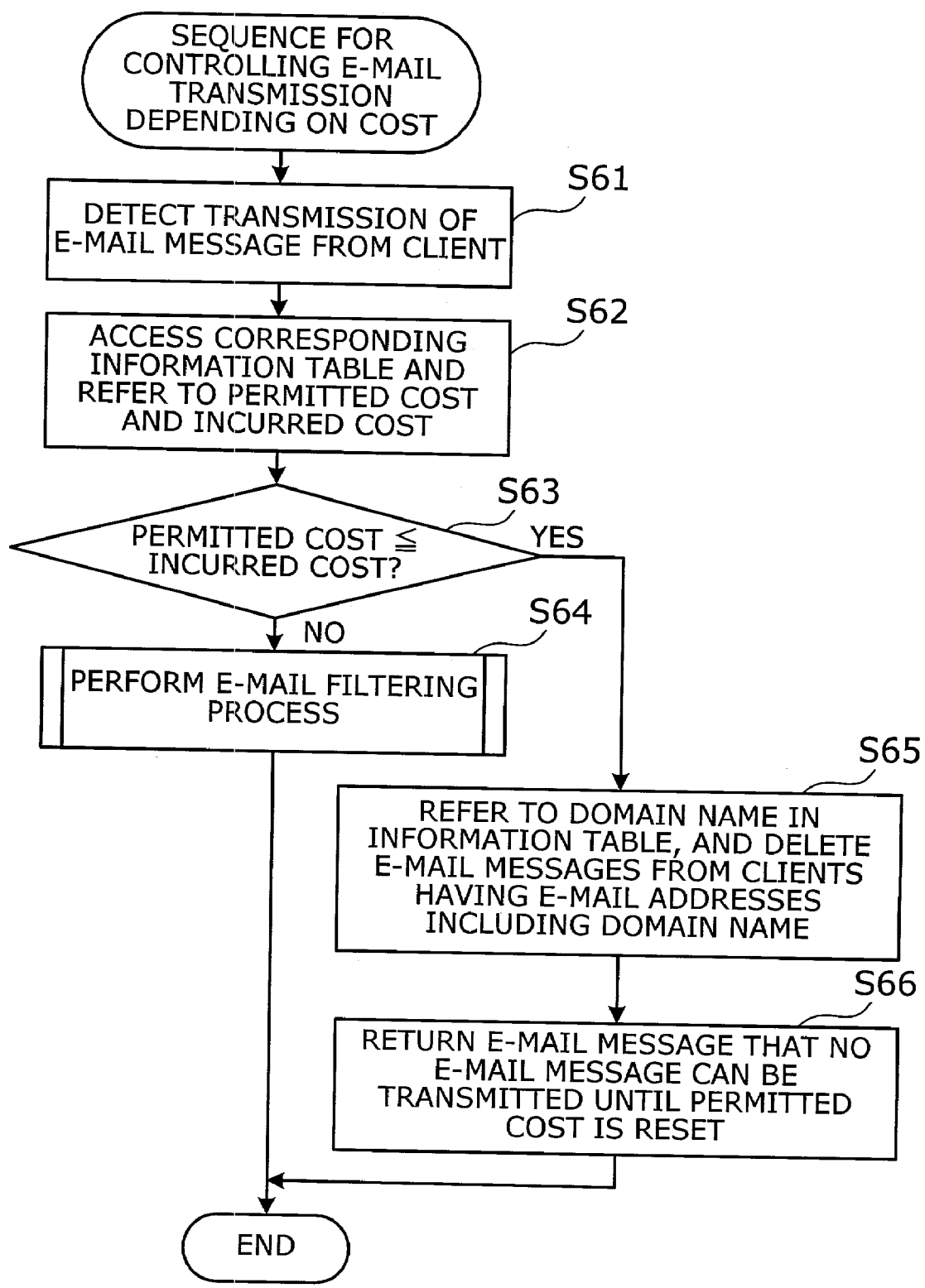
FIG. 17 is a flowchart of a sequence for controlling e-mail transmission depending on the cost.

FIG. 17 is a flowchart of a sequence for controlling e-mail transmission depending on the cost. The sequence shown in FIG. 17 will be described below with respect to step numbers.

[Step S61]

The e-mail transmission limiter 131 in the groupware server 130 detects the transmission of an e-mail message from one of the clients 141, 142, 143, . . . .

[Step S62]

The e-mail transmission limiter 131 accesses the information table 183 serving as a limitation determining reference, and refers to the permitted cost and the incurred cost. The information table 183 which serves as a limitation determining reference is the corporation information table 183a if managed in terms of corporations, the department information table 183b if managed in terms of departments, and the employee information table 183c if managed in terms of employees.

[Step S63]

The e-mail transmission limiter 131 determines whether or not the incurred cost is equal to or higher than the permitted cost (the permitted cost the incurred cost). If the incurred cost is equal to or higher than the permitted cost, then the processing goes to step S65. If the incurred cost is lower than the permitted cost, then the e-mail transmission limiter 131 transfers the e-mail message whose transmission has been detected in step S61 to the filtering server 110, and then the processing goes to step S64.

[Step S64]

The e-mail transmission limiter 131 performs the e-mail filtering process. Details of the e-mail filtering process will be described later on. Thereafter, the sequence is put to an end.

[Step S65]

The e-mail transmission limiter 131 refers to the domain name in the information table 183 serving as a limitation determining reference, and deletes e-mail messages from those clients which include the domain name in their e-mail addresses.

If the information table 183 serving as a limitation determining reference is the corporation information table 183a, then all e-mail messages from the clients having e-mail addresses (" . . . @ . . . .a.co.jp") including the corporation domain name "a.co.jp" set in the corporation information table 183a are deleted. If the information table 183 serving as a limitation determining reference is the department information table 183b, then all e-mail messages from the clients having department domain names (e.g., client host names (" . . . @ . . . .bumon-2.a.co.jp") including "bumon-2.a.co.jp") set in the department information table 183b are deleted. If the information table 183 serving as a limitation determining reference is the employee information table 183c, then all e-mail messages from the clients having client host names (e.g., "tyamada.bumon-2.a.co.jp") set in the employee information table 183c are deleted.

[Step S66]

The e-mail transmission limiter 131 returns an e-mail message that no e-mail message can be transmitted until the permitted cost is reset to the client which is the transmission source of the e-mail message. Actually, an e-mail message that no e-mail message can be transmitted is stored in the mail box in the groupware server 130 which corresponds to the client which is the transmission source of the e-mail message whose transmission has been detected in step S61.

Figure 18:
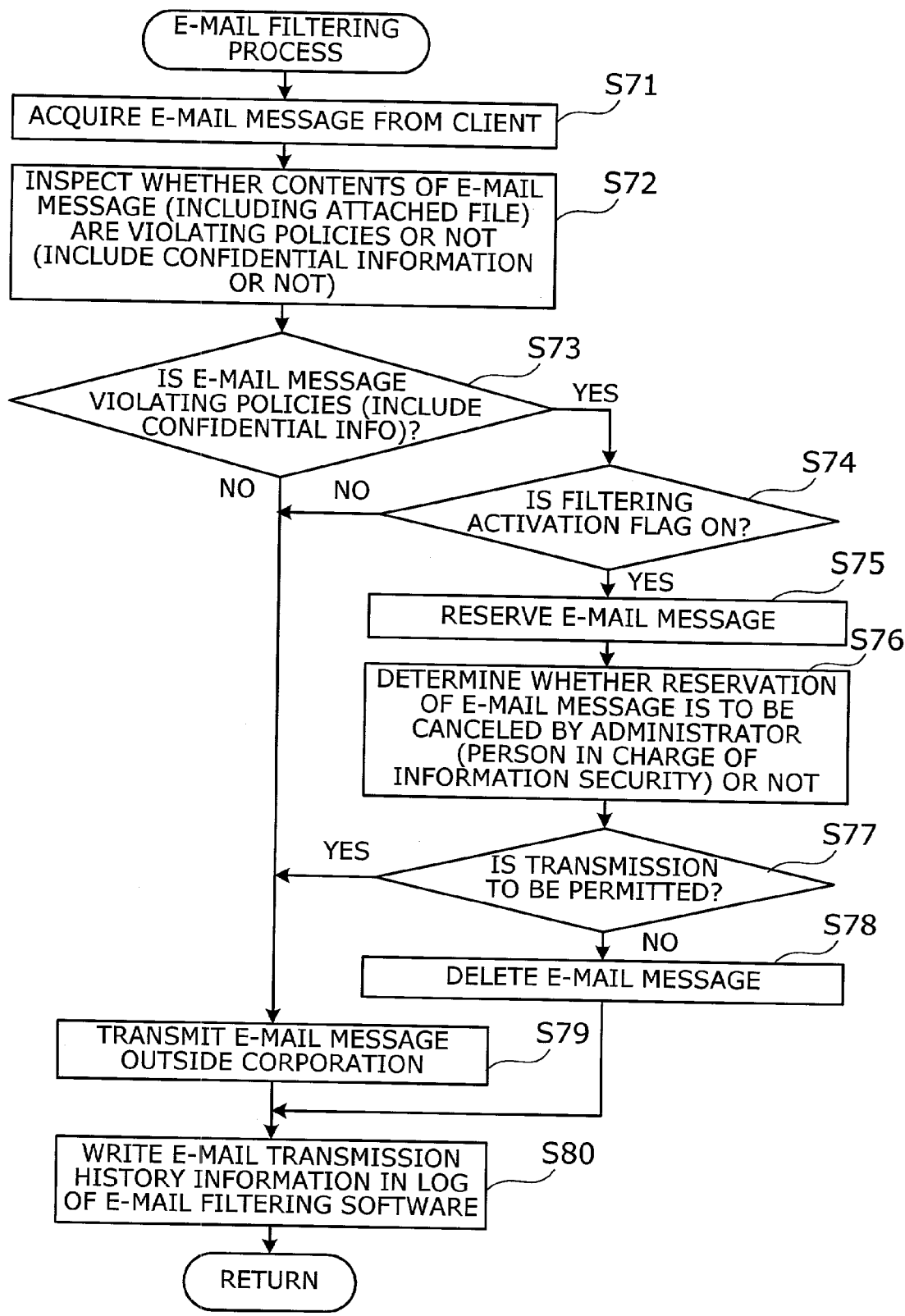
FIG. 18 is a flowchart of an e-mail filtering sequence.

FIG. 18 is a flowchart of the e-mail filtering sequence. The e-mail filtering sequence shown in FIG. 18 will be described below with respect to step numbers.

[Step S71]

The e-mail filtering unit 112 in the filtering server 110 acquires an e-mail message transmitted from one of the clients 141, 142, 143, . . . and transferred by the groupware server 130.

[Step S72]

The e-mail filtering unit 112 inspects whether the contents of the e-mail message (including any attachment files) are in violation of the policies, i.e., whether they contain confidential information or not, etc., based on whether they contain certain prespecified keywords or not, whether files of certain types are attached or not, whether their a copy is to be sent to a supervisor or not, or whether the client which has sent the e-mail message has an authority to send the e-mail message.

[Step S73]

The e-mail filtering unit 112 determines whether the e-mail message is in violation of the policies (contains confidential information, etc.) or not. If the e-mail message is in violation of the policies, then the processing goes to step S74. If the e-mail message is not in violation of the policies, then the processing goes to step S79.

[Step S74]

The e-mail filtering unit 112 determines whether the filtering activation flag is "ON" or not. If the transmission of e-mail messages which are in violation of the policies is permitted until the incurred cost reaches the permitted cost, then the filtering activation flag is set to "OFF" at the same time that the information table 183 is initialized. If the filtering activation flag is "ON", then the processing goes to step S75, and if the filtering activation flag is "OFF", then the processing goes to step S79.

[Step S75]

The e-mail filtering unit 112 reserves the e-mail message. When the e-mail message is reserved, it is not certain whether the e-mail message is to be transmitted or discarded, and the contents of the e-mail message are held in the e-mail filtering unit 112.

[Step S76]

The e-mail filtering unit 112 determines whether the reservation of the e-mail message is to be canceled or not in response to a control input from the administrator, i.e., the person in charge of information security. Specifically, the e-mail filtering unit 112 sends a notice of the e-mail message which is in violation of the policies to the client which is used by the administrator. The notice includes the contents of the e-mail message. Having received the notice, the client displays the type of the violated policy and the contents of the e-mail message, and accepts a control input which determines whether the cancellation of the reservation of the e-mail message is permitted or not. If the administrator enters a control input which determines whether the cancellation of the reservation of the e-mail message is permitted or not, the client sends a notice of the determined result to the e-mail filtering unit 112 of the filtering server 110. Based on the notice of the determined result, the e-mail filtering unit 112 determines whether the reservation of the e-mail message is to be canceled or not.

[Step S77]

The e-mail filtering unit 112 determines whether the e-mail message is to be transmitted or not based on the determined result in step S76. Specifically, if the e-mail filtering unit 112 has received the determined result indicating that the reservation of the e-mail message is to be canceled, the e-mail filtering unit 112 permits the e-mail message to be transmitted. Otherwise, the e-mail filtering unit 112 denies the transmission of the e-mail message. If the transmission of the e-mail message is permitted, then the processing goes to step S79. If the transmission of the e-mail message is not permitted, then the processing goes to step S78.

[Step S78]

The e-mail filtering unit 112 deletes the e-mail message which has been held in the reserved state. Thereafter, the processing goes to step S80.

[Step S79]

The e-mail filtering unit 112 transmits the e-mail message outside the corporation. Specifically, the e-mail filtering unit 112 transfers the e-mail message whose transmission has been detected in step S71 to the mail/proxy server 160 via the firewall server 150. The mail/proxy server 160 transmits the e-mail message via the Internet 30 to another mail server which is specified by the mail address of the destination. Then, the processing goes to step S80.

[Step S80]

The e-mail filtering unit 112 writes e-mail transmission history information in the mail transmission history information 113.

As described above, a cost is calculated depending on the private use of the Internet, and communications of contents can be filtered based on accumulated costs. As a result, the following advantages are offered:

[1] Actual access to regulated sites in the contents filtering can automatically be replaced with an indicator (a loss (cost) of productivity) based on a certain value, and use of the Internet can be controlled according to the indicator.

[2] It is possible to automatically calculate a permitted cost from given information, and to allow access to regulated sites within the range of the calculated permitted cost.

[3] Even though the different filtering processes, i.e., the URL filtering process (for filtering access to regulated sites) and the e-mail filtering process (for filtering e-mail messages in violation of policies), are involved, actual access to regulated sites and transmission of e-mail messages violating policies can automatically be replaced with a common indicator, and use of the Internet can be controlled according to the indicator.

[4] With respect to the above items [1] through [3], if the user is of a hierarchical nature such as a corporation (a corporation, departments, employees), then use of the Internet can be controlled according to the above indicator in terms of different levels such as a corporation, departments, employees.

[Modification 1]

In the above embodiments, when the incurred cost becomes higher than the permitted cost, all HTTP access requests and all e-mail message transmissions are inhibited. However, when the incurred cost becomes higher than the permitted cost, only communications of regulated contents may be inhibited. A process of inhibiting communications of regulated contents according to a modification will be described below.

Figure 19:
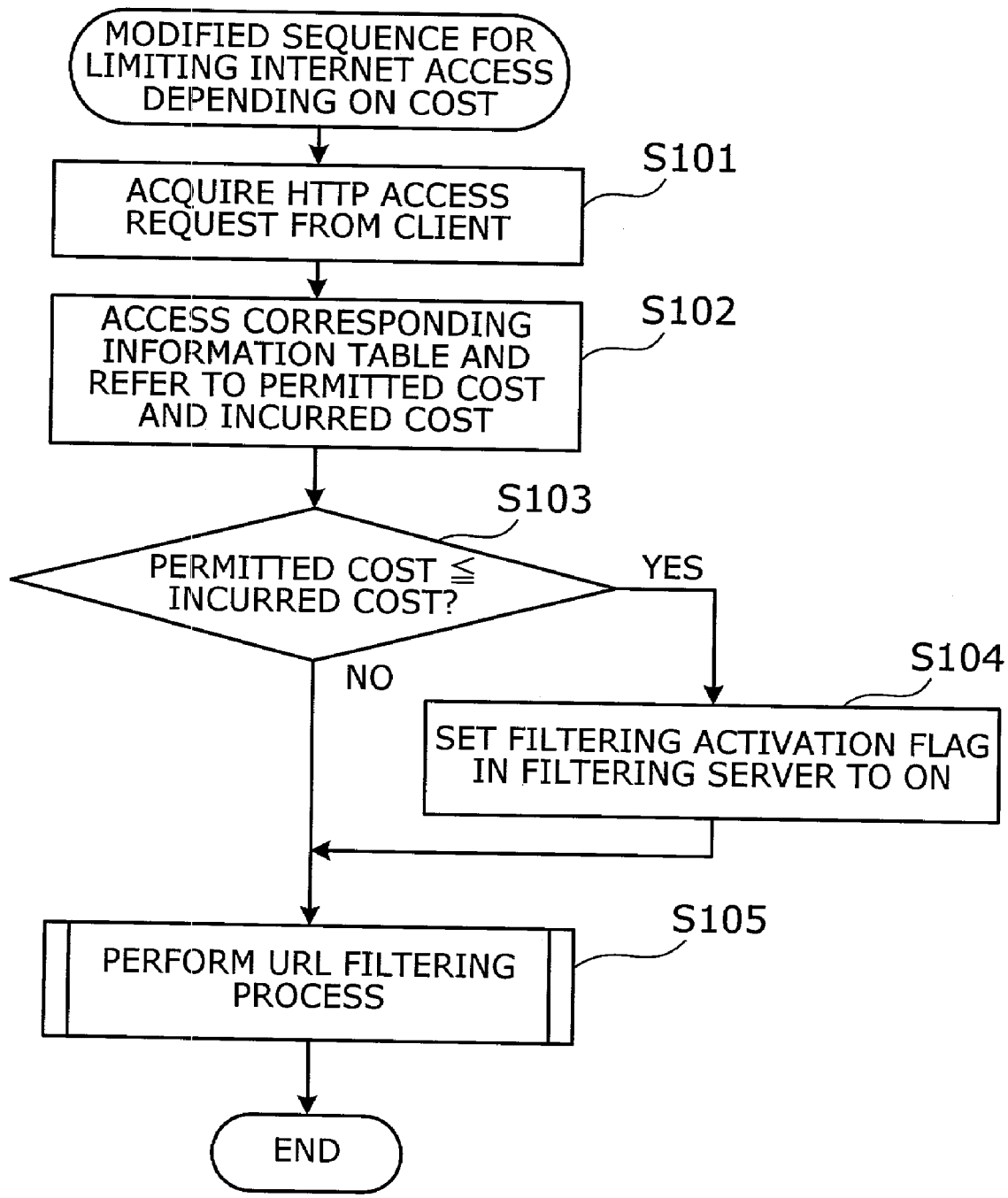
FIG. 19 is a flowchart of a modified sequence for limiting Internet access depending on the cost.

FIG. 19 is a flowchart of a modified sequence for limiting Internet access depending on the cost. The sequence shown in FIG. 19 will be described below with respect to step numbers.

[Step S101]

The Internet access limiter 121 acquires an HTTP access request from one of the clients 141, 142, 143, . . . .

[Step S102]

The Internet access limiter 121 accesses the information table 183 serving as a limitation determining reference, and refers to the permitted cost and the incurred cost.

[Step S103]

The Internet access limiter 121 determines whether or not the incurred cost is equal to or higher than the permitted cost (the permitted cost the incurred cost). If the incurred cost is equal to or higher than the permitted cost, then the processing goes to step S104. If the incurred cost is lower than the permitted cost, then the Internet access limiter 121 transfers the HTTP access request acquired in step S101 to the filtering server 110, and then the processing goes to step S105.

[Step S104]

The Internet access limiter 121 transmits a flag setting request to change the filtering activation flag to "ON" to the URL filtering unit 111 of the filtering server 110. In response to the flag setting request, the URL filtering unit 111 sets the filtering activation flag to "ON" (or keeps the filtering activation flag unchanged if it is already "ON"). The Internet access limiter 121 transfers the HTTP access request to the URL filtering unit 111.

[Step S105]

The filtering server 110 and the filtering log server 170 cooperate with each other to perform the URL filtering process. Details of the URL filtering process are the same as those shown in FIG. 16. Thereafter, the sequence is put to an end.

The filtering activation flag in the URL filtering unit 111 is changed to "OFF" when the information table 183 is initialized.

Figure 20:
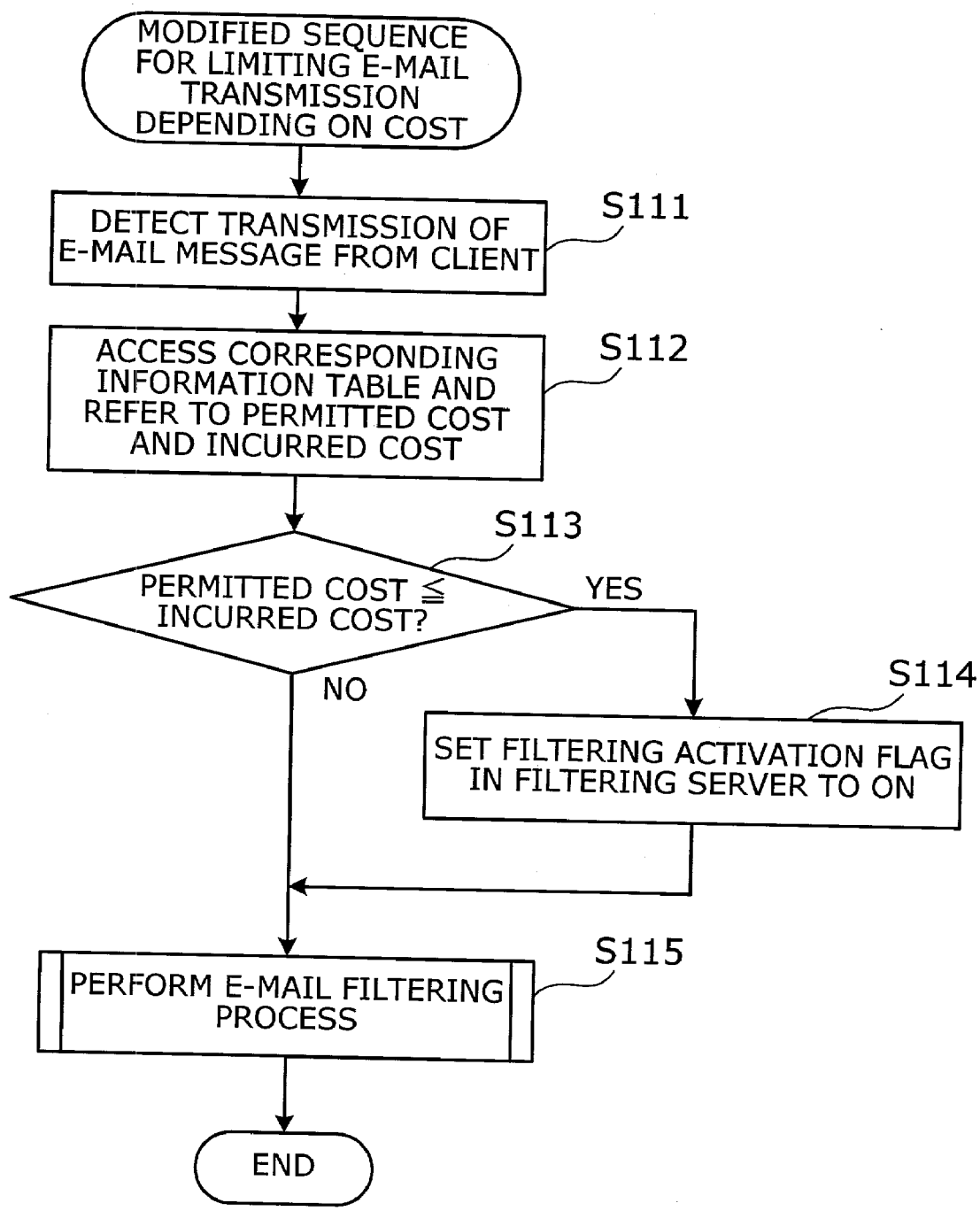
FIG. 20 is a flowchart of a modified sequence for limiting e-mail transmission depending on the cost.

FIG. 20 is a flowchart of a modified sequence for limiting e-mail transmission depending on the cost. The sequence shown in FIG. 20 will be described below with respect to step numbers.

[Step S111]

The e-mail transmission limiter 131 in the groupware server 130 detects the transmission of an e-mail message from one of the clients 141, 142, 143, . . . .

[Step S112]

The e-mail transmission limiter 131 accesses the information table 183 serving as a limitation determining reference, and refers to the permitted cost and the incurred cost.

[Step S113]

The e-mail transmission limiter 131 determines whether or not the incurred cost is equal to or higher than the permitted cost (the permitted cost the incurred cost). If the incurred cost is equal to or higher than the permitted cost, then the processing goes to step S114. If the incurred cost is lower than the permitted cost, then the e-mail transmission limiter 131 transfers the e-mail message whose transmission has been detected in step S111 to the filtering server 110, and then the processing goes to step S115.

[Step S114]

The e-mail transmission limiter 131 transmits a flag setting request to change the filtering activation flag to "ON" to the e-mail filtering unit 112 of the filtering server 110. In response to the flag setting request, the e-mail filtering unit 112 sets the filtering activation flag to "ON" (or keeps the filtering activation flag unchanged if it is already "ON"). The e-mail transmission limiter 131 transfers the e-mail message to the e-mail filtering unit 112.

[Step S115]

The e-mail filtering unit 112 performs the e-mail filtering process. Details of the e-mail filtering process are the same as those shown in FIG. 18. Thereafter, the sequence is put to an end.

The filtering activation flag in the e-mail filtering unit 112 is changed to "OFF" when the information table 183 is initialized.

As shown in FIGS. 19 and 20, if the filtering activation flag is set to "ON" when the incurred cost becomes equal to or higher than the permitted cost, then the ordinary filtering process is subsequently carried out by the filtering server 110. As a result, communications of regulated contents are blocked.

[Modification 2]

In the above embodiment, the filtering process between the intranet 100 in a corporation and the Internet 30 has been described. However, it is possible to perform the filtering process depending on the cost in service providing companies which provide hosting services for renting high-performance servers for giving out information on the Internet and high-speed Internet lines. In such an application, the corporation information table 183*a* is provided for each corporation which is a customer. The clients 141, 142, 143, . . . are connected to the network 10 via public lines.

[Modification 3]

If the users do not attach importance to the real-time capability in the hosting services according to the modification 2, then a static outsourcing business can be established between the system in the service providing company and the clients.

In such an application, the following sequences are carried out:

1st sequence: The user computers transmits a monitoring log of filtering software periodically (e.g., once a week or once a month) to the cost information server 180 of the service providing company, or the cost information server 180 of the service providing company fetches monitoring logs in the user computers through the network.
2nd sequence: The cost information server 180 is installed in the facility of the service providing company, and calculates the incurred costs for one week or one month.
3rd sequence: The incurred cost information in each phase of employees, departments, and corporations are reported to the users particularly from the standpoint of the problematic state "the permitted cost the incurred cost".
4th sequence: Upon receiving the report in the 3rd sequence, the users introduce means for inhibiting Internet access and use of e-mail in each phase of problematic employees, problematic departments, and problematic corporations which tend to produce the state "the permitted cost the incurred cost".

[Modification 4]

The system according to the above embodiment is applied to corporations. However, the same system may be incorporated in systems in schools. In such an application, the data structure in the information table 183 may be changed to the organization of the school. For example, if the corporation information table is used as a school information table, the department information table as a class information table, the employee information table as a student information table, and also if information related to corporations is replaced with information relative to schools, then the system according to the above embodiment is applicable to schools.

Examples of information replacements are as follows:

The number of employees→the number of students;

The average wage per hour (per person)→the average tuition (per person);

The number of yearly labor days (per person)→the average number of learning days (per person);

The number of monthly labor days (per person)→the average number of monthly learning days (per person);

The number of members→the number of students in a class; and

The employee Nos. of members→the serial Nos. of students.

If the system is applied to a school, the types of regulated sites and the types of policy violations are changed from those related to corporations to those related to schools. Confidential information to be defined with respect to schools includes the list of teachers and students (parents), the bank account numbers related to schools, etc. The idea of a loss (cost) of productivity, which is a corporation-oriented concept, needs to change to a loss of tuition or a loss of learning opportunity in school applications.

Therefore, by changing registered information without limiting users, it is possible to apply the filtering process under cost management to network systems of various organizations such as schools.

[Modification 5]

In the above embodiment, the incurred cost is calculated once a day. However, the incurred cost may be calculated each time a communication request for contents (an HTTP access request or an e-mail transmission request) is outputted. If an outputted communication request itself is a regulated event, then before the incurred cost is calculated, the value of history information (regulated URL access history information or e-mail transmission policy violation history information) is updated depending on regulated items covered by the communication request. Specifically, prior to actual communications, an incurred cost expected when communications are performed according to the communication request is calculated in advance, and if the expected incurred cost is equal to or higher than the permitted cost, then the communications are inhibited. Consequently, the transmission of e-mail messages which will cause serious policy violations, such as a leakage of confidential information (the cost of a single event of communications is equal to or higher than the permitted cost), is inhibited at all times.

[Modification 6]

The above processing functions can be performed by having a general computer execute a given program. If the processing functions are performed by having a general computer execute a given program, then there is provided a server program which describes the processing details of the functions which the filtering server 110, the cost-linked control server 120, the groupware server 130, the filtering log server 170, and the cost information server 180 should have. A server computer executes the server program in response to a request from a client computer. In this manner, the above processing functions are performed on the server computer, which transmits processed results to the client computer.

The server program which describes the processing details of the functions can be recorded in a recording medium which can be read by the server computer. The recording medium which can be read by the server computer may be a magnetic recording device, an optical disk, a magneto-optical recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disc Read Only Memory), a CD-R (Recordable)/RW(ReWritable), or the like. The magneto-optical recording medium may be a MO (magneto-optical) disk.

To distribute the server program, portable recording mediums such as DVDs, CD-ROMs, etc. in which the server program is recorded are offered for sale.

The server computer which runs the server program stores the server program recorded the portable recording medium into its own memory. Then, the server computer reads the server program from its own memory, and runs the server program to perform processes according to the server program. The server computer may read the server program directly from the portable recording medium and run the server program to perform processes according to the server program.

According to the present invention, as described above, a loss caused by communications of regulated sites is converted into a cost, and if the converted incurred cost exceeds the permitted cost, subsequent communications of regulated sites are inhibited. Therefore, communications of regulated sites are possible until the incurred cost exceeds the permitted cost. As a result, it is possible to perform contents filtering in a state of balance accomplished between a cost (loss) which is caused by a reduction in the business efficiency due to a failure to access necessary information by fully inhibiting communications of regulated contents and a cost (loss) which is caused by privately performing communications of regulated contents.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of filtering a plurality of contents of e-mail messages on a network, comprising:
   monitoring, by a program executed on a computer, said plurality of contents of e-mail messages transmitted on the network and determining whether one or more of said plurality of contents are regulated confidential contents satisfying a plurality of predefined regulatory policy requirements;
   filtering said regulated confidential contents by inspecting and determining whether transmission of said regulated confidential contents violates one or more of the plurality of regulatory policy requirements wherein the plurality of predefined regulatory policy requirements include at least one of forgetting to send a copy to a supervisor and forgetting to mark confidential on a confidential document;
   if said regulated confidential contents violates at least one of forgetting to send a copy to a supervisor and forgetting to mark confidential on a confidential document then:
   counting a number of times that said regulated confidential contents are transmitted;
   converting a loss caused by transmitting said regulated confidential contents into an incurred cost by establishing costs for respective types of the one or more of the plurality of regulatory policy requirements based on the counted number of times that said regulated confidential contents are transmitted and integrating costs depending on the types of the one or more of the plurality of regulatory policy requirements satisfied by the regulated confidential contents which have been transmitted within a predetermined period; and
   if said incurred cost is in excess of a preset permitted cost, inhibiting subsequent transmissions of said regulated confidential contents.

2. The method of filtering contents of e-mail messages according to claim 1, wherein said permitted cost is calculated based on a permitted time per person for permitting use of said regulated confidential contents and a cost per unit time per person.

3. The method of filtering contents of e-mail messages according to claim 1, further comprising:
   calculating said incurred cost for each of a plurality of groups of an organization which uses said network; and
   setting said permitted cost for each of said plurality of groups, and, when a group of said plurality of groups in which said incurred cost exceeds said permitted cost is detected, inhibiting communications of said regulated contents based on a request of a user included in the detected group.

4. The method of filtering contents of e-mail messages according to claim 3, wherein when one or more of the plurality of groups in which said incurred cost exceeds said permitted cost is detected, all communications of said contents based on the request of the user included in the one or more groups are inhibited.

5. The method of filtering contents of e-mail messages according to claim 1, wherein the loss is converted into said incurred cost at predetermined periodic intervals.

6. The method of filtering contents of e-mail messages according to claim 1, wherein said contents whose transmissions are monitored include Web pages which have been browsed and e-mail messages which have been transmitted.

7. The method of filtering contents of e-mail messages according to claim 6, wherein when the transmissions of said regulated contents are inhibited, the transmission of e-mail messages satisfying said regulatory requirements is blocked.

8. An apparatus for filtering a plurality of contents of e-mail messages on a network, comprising:
   regulated contents determining means for monitoring transmissions of said plurality of contents of e-mail messages on the network and determining whether said plurality of contents are regulated confidential contents satisfying a plurality of predefined regulatory policy requirements or not;
   filtering means for filtering said plurality of contents by inspecting and determining whether transmission of said regulated confidential contents violates one or more of the plurality of regulatory policy requirements wherein the plurality of predefined regulatory policy requirements include at least one of forgetting to send a copy to a supervisor and forgetting to mark confidential on a confidential document;

communications counting means for counting a number of times that said regulated confidential contents which have been determined as the regulated confidential contents by said regulated contents determining means are transmitted if said regulated confidential contents violates at least one of forgetting to send a copy to a supervisor and forgetting to mark confidential on a confidential document;

incurred cost converting means for converting a loss caused by transmitting said regulated confidential contents into an incurred cost by establishing costs for respective types of the one or more of the plurality of regulatory policy requirements based on the counted number of times that the regulated confidential contents are transmitted and integrating costs depending on the types of the one or more of the plurality of regulatory policy requirements satisfied by the regulated confidential contents which have been transmitted within a predetermined period; and communication inhibiting means for, if said incurred cost produced by said incurred cost converting means is in excess of a preset permitted cost, inhibiting subsequent transmissions of said regulated confidential contents.

9. A recording medium readable by a computer and encoded with a computer program for filtering a plurality of contents of e-mail messages on a network, said program executable by the computer to perform a process comprising:

monitoring, by the program executed in said computer, said plurality of contents of e-mail messages transmitted on the network and determining whether one or more of said plurality of contents are regulated confidential contents satisfying a plurality of predefined regulatory policy requirements;

filtering said regulated confidential contents by inspecting and determining whether transmission of said regulated confidential contents violates one or more of the plurality of regulatory policy requirements wherein the plurality of predefined regulatory policy requirements include at least one of forgetting to send a copy to a supervisor and forgetting to mark confidential on a confidential document;

if said regulated confidential contents violates at least one of forgetting to send a copy to a supervisor and forgetting to mark confidential on a confidential document then:

counting a number of times that the regulated confidential contents are transmitted;

converting a loss caused by transmitting said regulated confidential contents into an incurred cost by establishing costs for respective types of the one or more of the plurality of regulatory policy requirements based on the counted number of times that said regulated confidential contents are transmitted and integrating costs depending on the types of the one or more of the plurality of regulatory policy requirements satisfied by the regulated confidential contents which have been transmitted within a predetermined period; and if said incurred cost is in excess of a preset permitted cost, inhibiting subsequent transmissions of said regulated confidential contents.

\* \* \* \* \*